(12) United States Patent
Ogawa et al.

(10) Patent No.: US 8,190,790 B1
(45) Date of Patent: May 29, 2012

(54) STORAGE APPARATUS AND METHOD OF CONTROLLING THE SAME

(75) Inventors: Masato Ogawa, Chigasaki (JP); Tetsuya Inoue, Odawara (JP); Tomoki Tanoue, Odawara (JP); Masateru Kurokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/133,813

(22) Filed: Jun. 9, 2011

(51) Int. Cl.
*G06F 3/00* (2006.01)
(52) U.S. Cl. ............................................. 710/8; 370/252
(58) Field of Classification Search .......................... None
See application file for complete search history.

(56) References Cited

U.S. PATENT DOCUMENTS

| | | | | |
|---|---|---|---|---|
| 7,133,956 B2 * | 11/2006 | Handa et al. | .................. | 710/305 |
| 7,688,749 B1 * | 3/2010 | Lo | .................................. | 370/252 |
| 7,977,951 B1 * | 7/2011 | Lo et al. | ........................... | 324/543 |
| 8,014,313 B1 * | 9/2011 | Lo | .................................. | 370/252 |
| 2008/0028112 A1 | 1/2008 | Kubo et al. | | |
| 2010/0014567 A1 | 1/2010 | Yamamoto | | |
| 2010/0098140 A1 * | 4/2010 | Huang et al. | .................. | 375/219 |

FOREIGN PATENT DOCUMENTS

| | | |
|---|---|---|
| JP | 2010-026651 A | 2/2010 |
| WO | 02/075535 A1 | 9/2002 |
| WO | 2009/013081 A1 | 1/2009 |

* cited by examiner

*Primary Examiner* — Elias Mamo
(74) *Attorney, Agent, or Firm* — Volpe and Koenig, P.C.

(57) ABSTRACT

Appropriate parameters can be efficiently set for network ports included in a storage apparatus. A storage apparatus performing I/O processing on a storage drive in response to an I/O request manages a first table in which a network device (SAS controller, SAS expander) is associated with location information of the network ports, a second table in which the cable length of a network cable coupled to each of the network ports is associated with a port ID of the network port, and a relationship between the cable length of the network cable and the parameter (output amplitude, pre-emphasis) set for the network port. The storage apparatus acquires the cable length of the network cable from the second table, determines the parameters corresponding to the acquired cable length from the above relationship, and sets the determined parameter for the network port.

12 Claims, 32 Drawing Sheets

[Fig. 1]
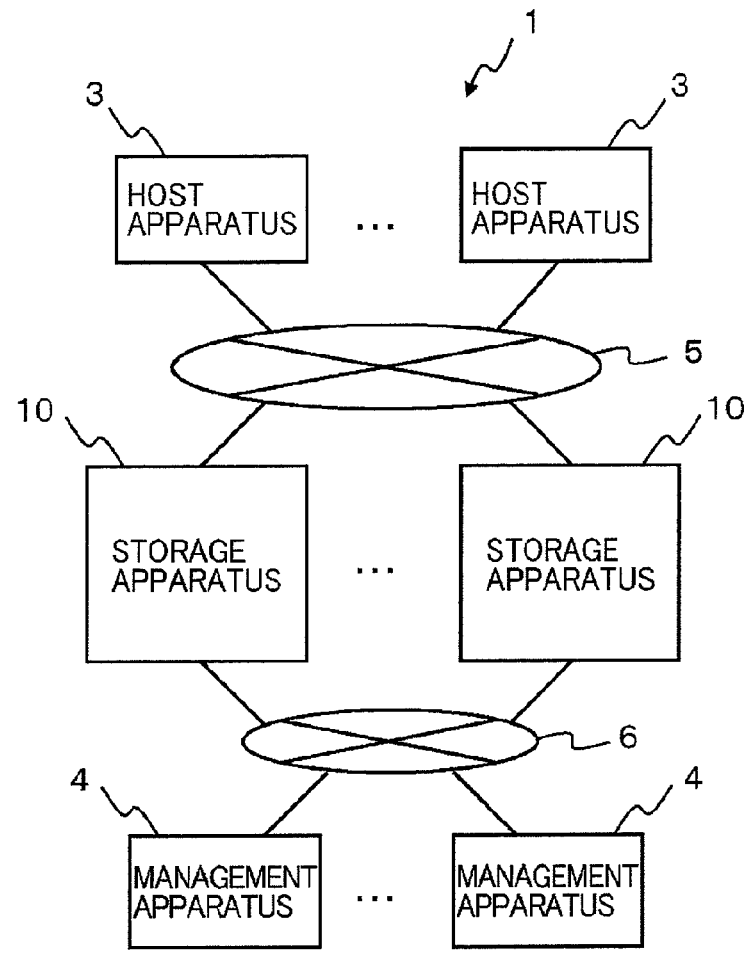
[Fig. 2]
HOST APPARATUS
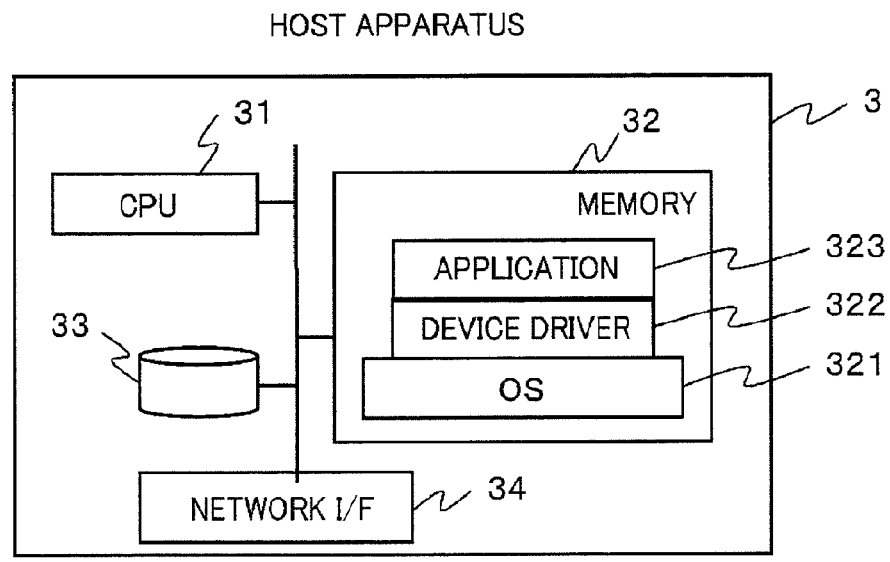

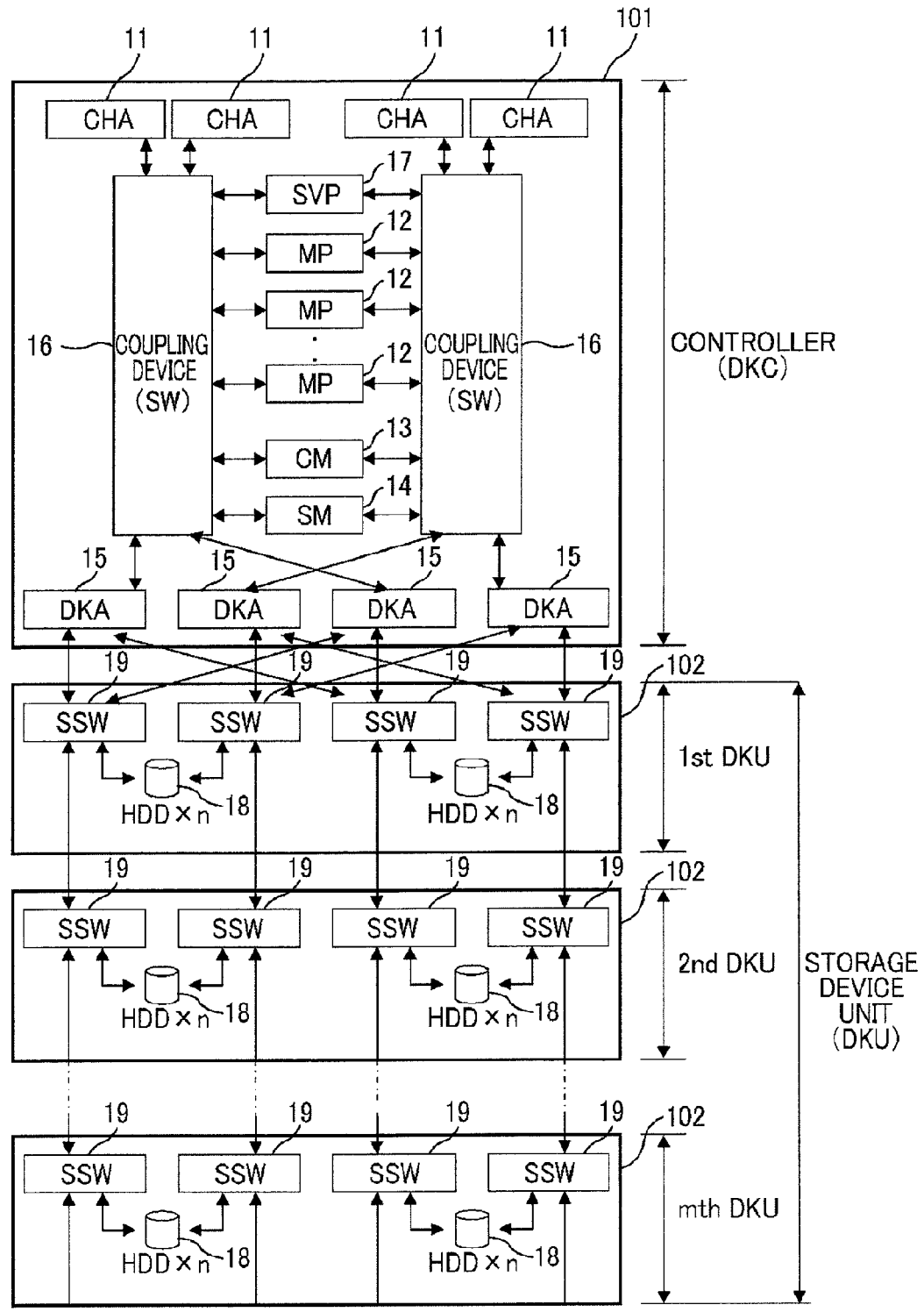
[Fig. 3]

[Fig. 4]
MANAGEMENT APPARATUS
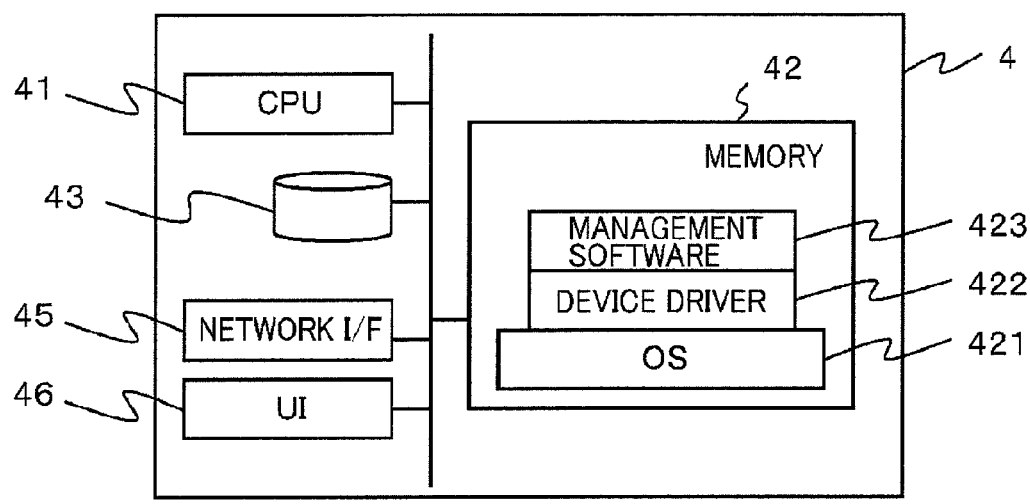

[Fig. 5]
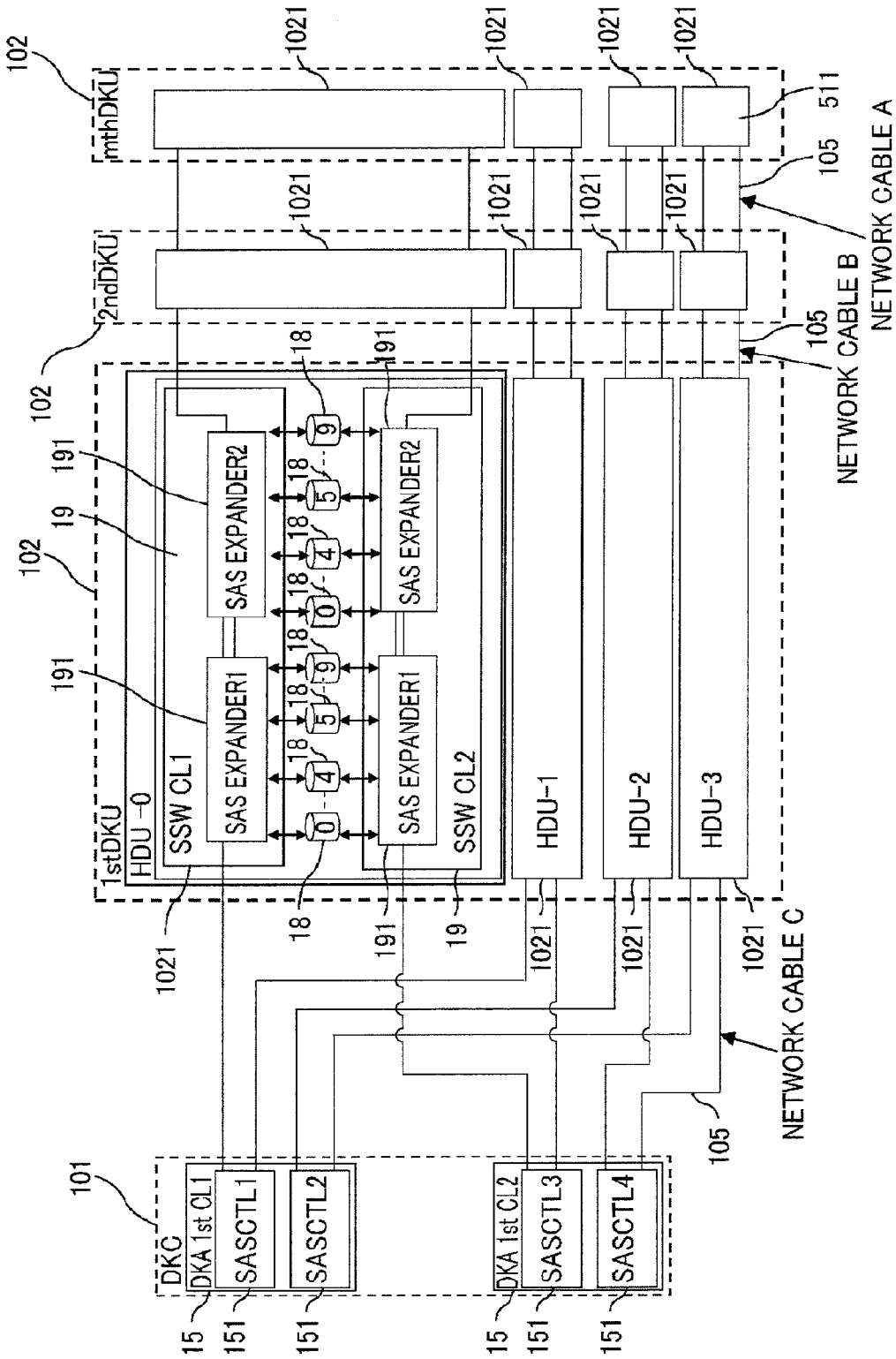

[Fig. 6]
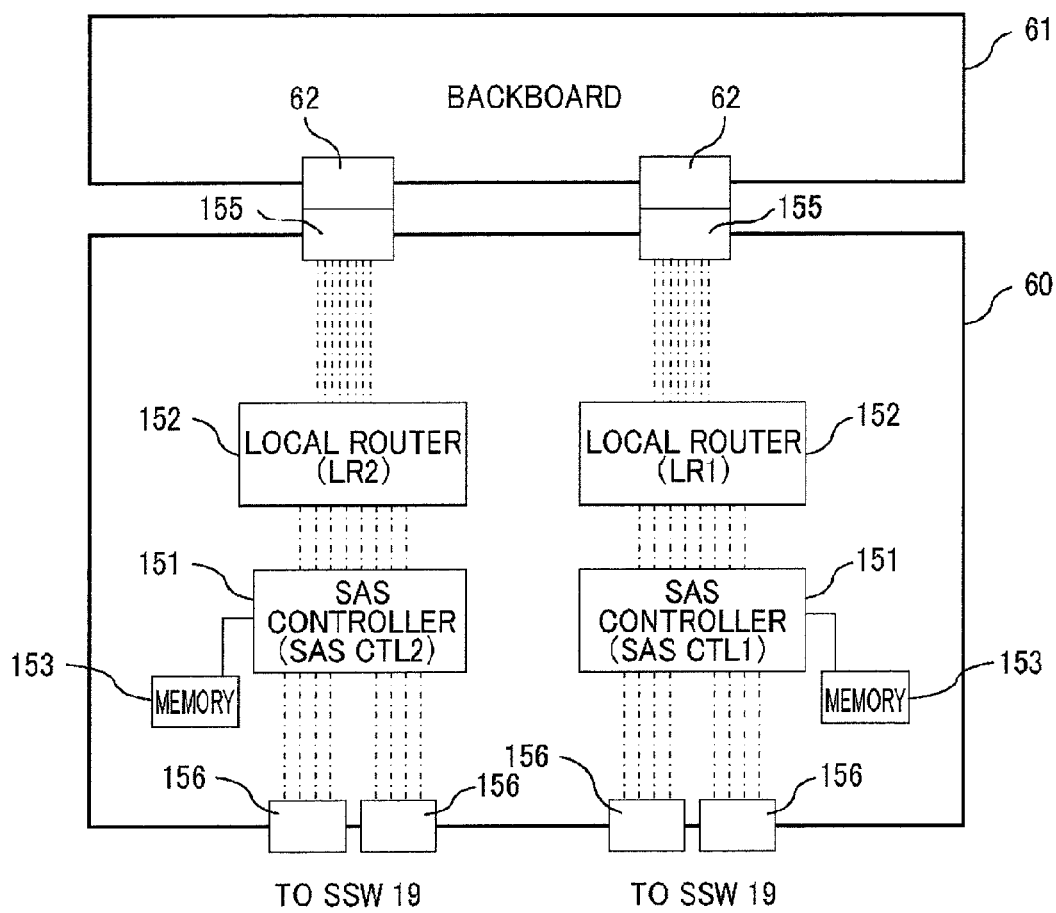

[Fig. 7]
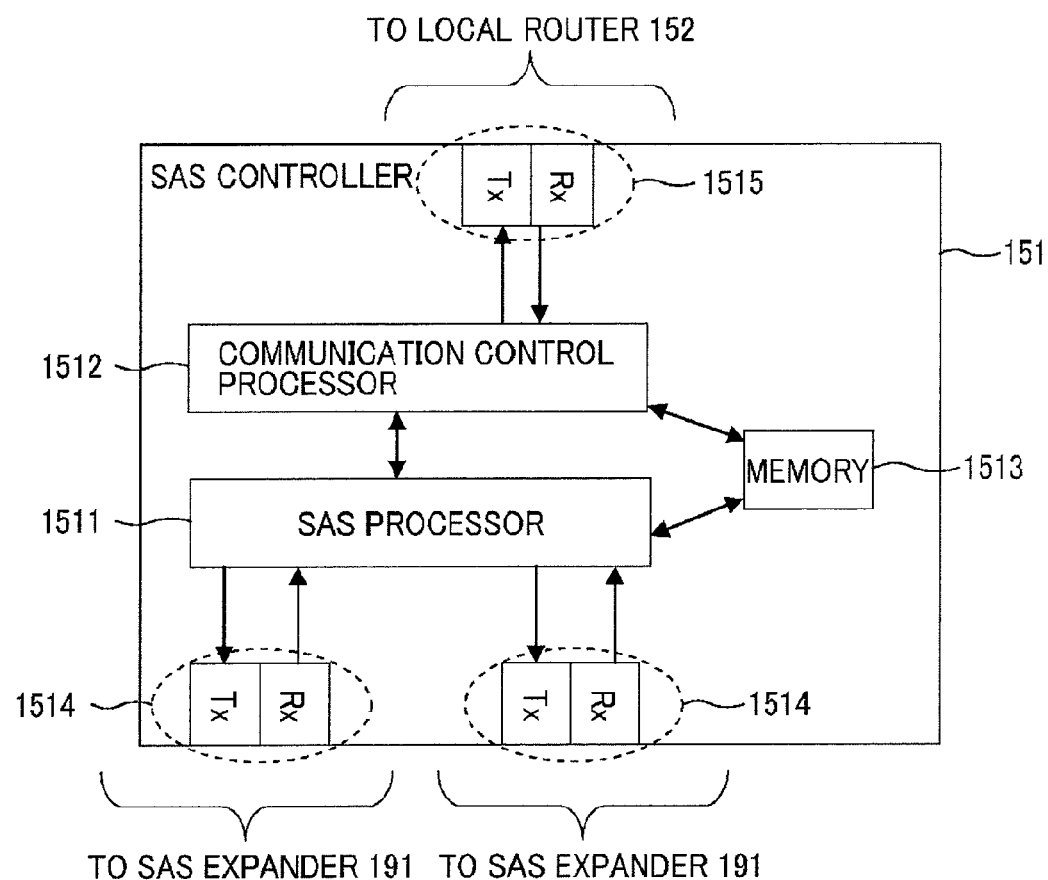

[Fig. 8]
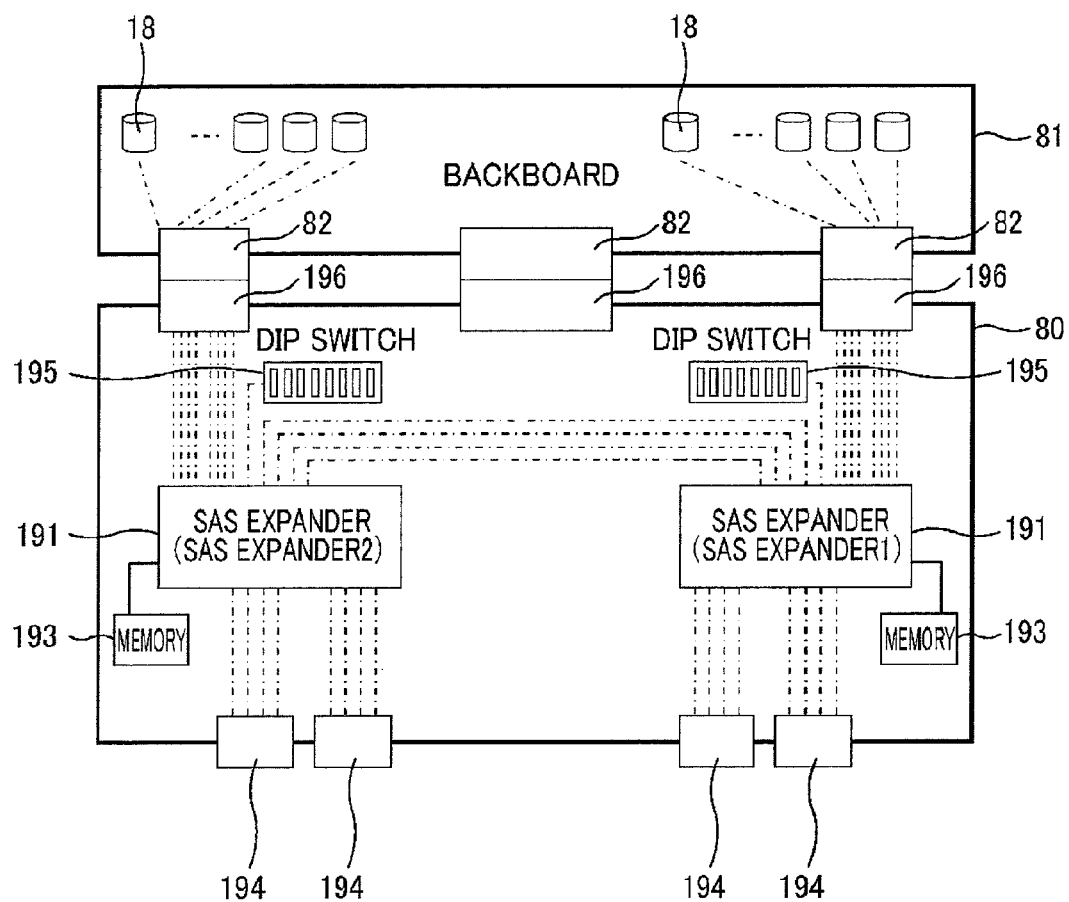

[Fig. 9]
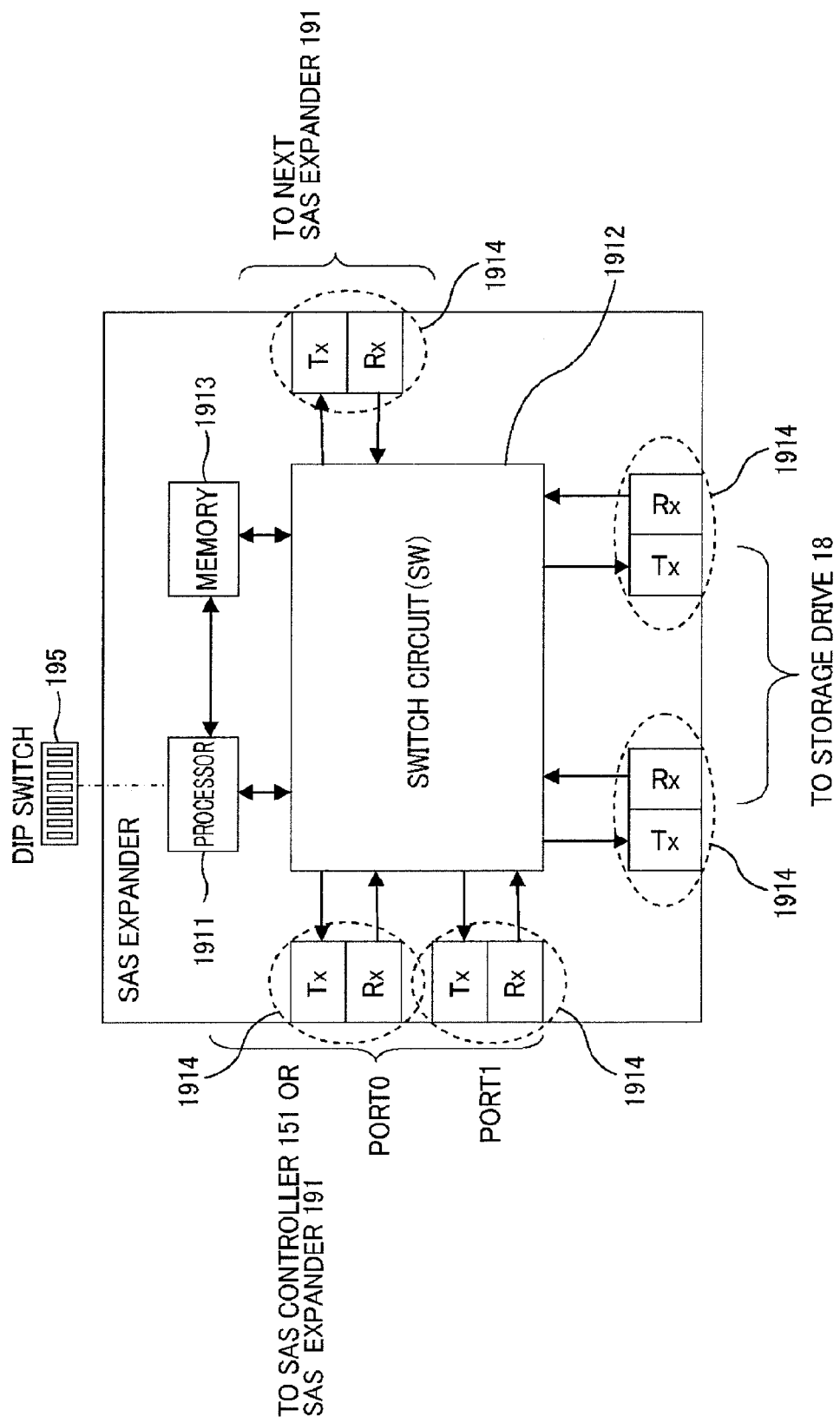

[Fig. 10]
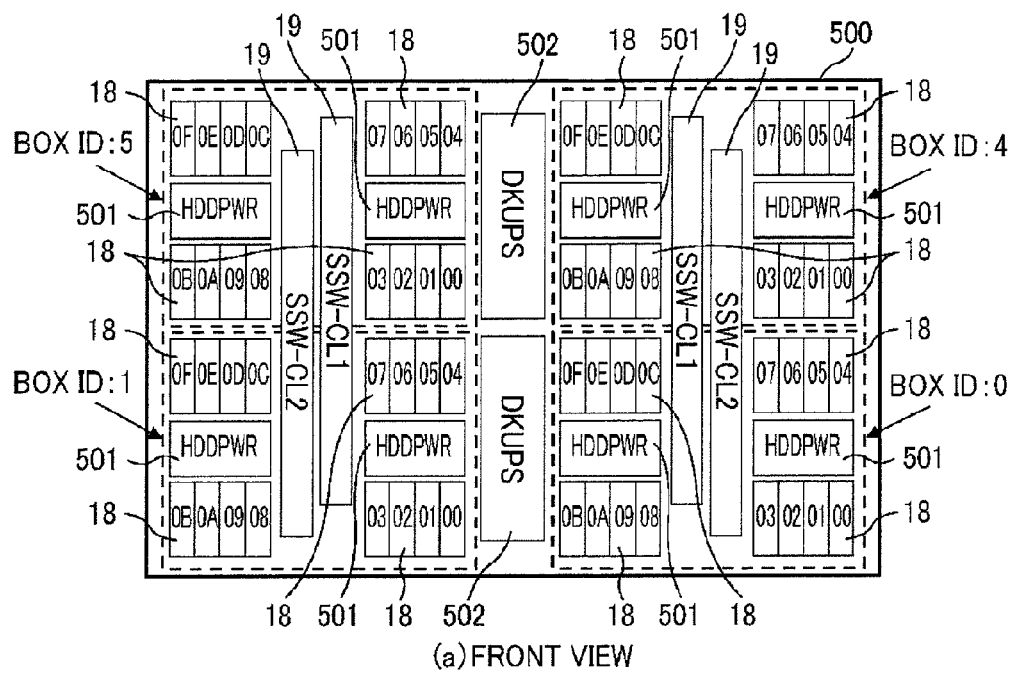
(a) FRONT VIEW
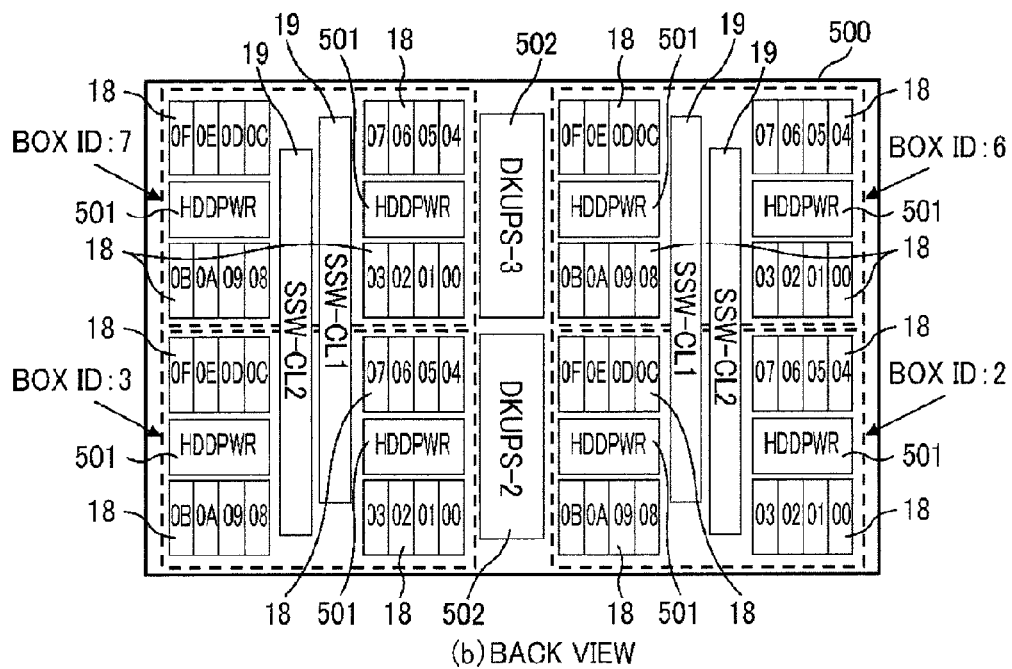
(b) BACK VIEW

[Fig. 11]
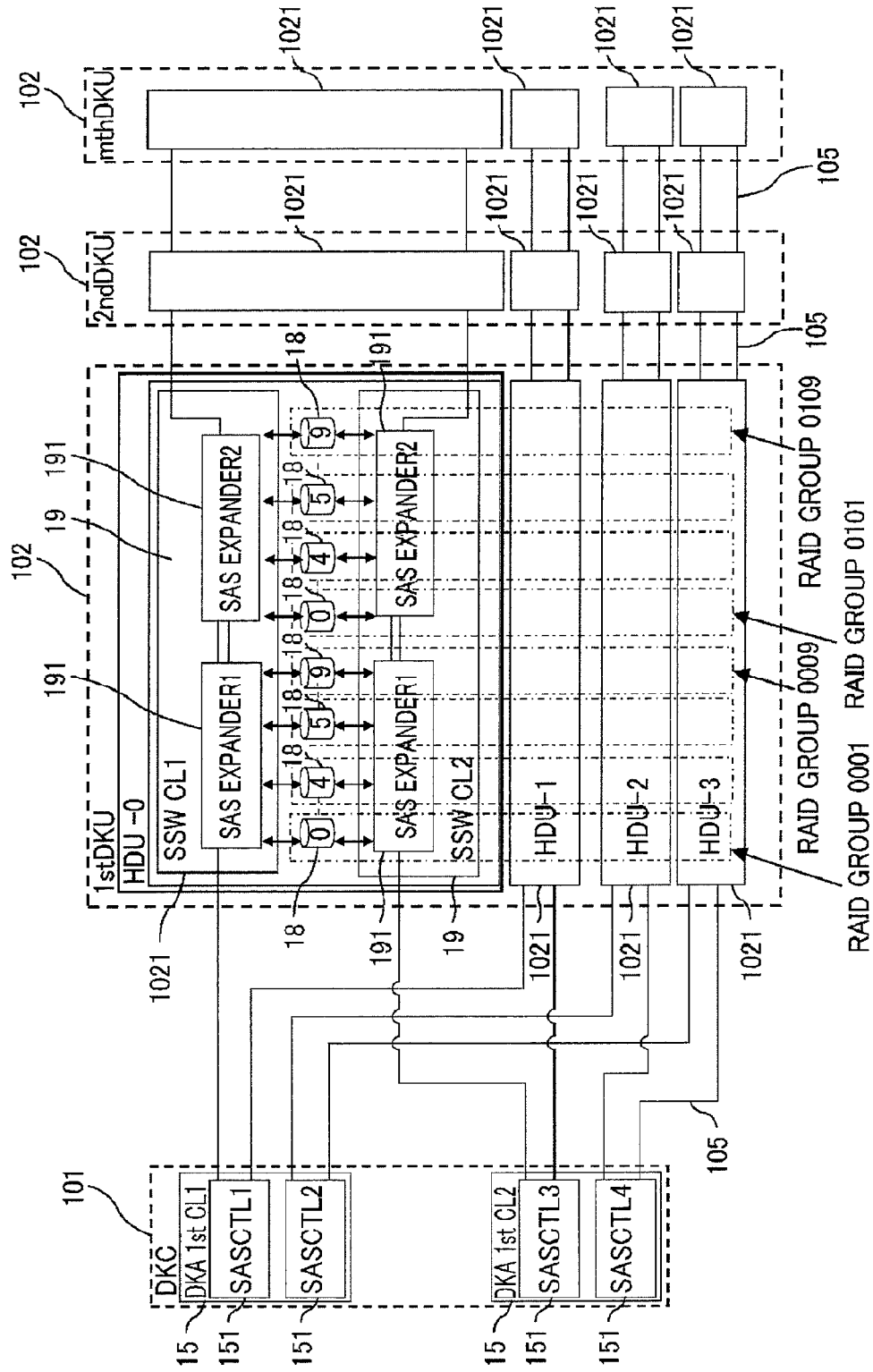

[Fig. 12]

RAID GROUP MANAGEMENT TABLE 1200

| BOX ID (1211) | DRIVE ID (1212) | RAID GROUP ID (1213) |
|---|---|---|
| 00 | 00 | 0001 |
| 00 | 01 | 0002 |
| 00 | 02 | 0003 |
| . | . | . |
| 00 | 09 | 0009 |
| 01 | 00 | 0001 |
| 01 | 01 | 0002 |
| 01 | 02 | 0003 |
| . | . | . |
| 01 | 09 | 0009 |
| 02 | 00 | 0001 |
| 02 | 01 | 0002 |
| 02 | 02 | 0003 |
| . | . | . |
| 02 | 09 | 0009 |
| 03 | 00 | 0001 |
| 03 | 01 | 0002 |
| 03 | 02 | 0003 |
| . | . | . |
| 03 | 09 | 0009 |
| 04 | 00 | 0101 |
| 04 | 01 | 0102 |
| 04 | 02 | 0103 |
| . | . | . |
| 04 | 09 | 0109 |
| . | . | . |
| . | . | . |
| . | . | . |
| XX | 00 | YY01 |
| XX | 01 | YY02 |
| XX | 02 | YY03 |
| . | . | . |
| XX | 09 | YY09 |

[Fig. 13]

| BIT | FUNCTION | NO | BIT | FUNCTION | NO | BIT | FUNCTION | NO | BIT | FUNCTION | NO |
| --- | --- | --- | --- | --- | --- | --- | --- | --- | --- | --- | --- |
| 64 | NAA | | 48 | IEEE_COMPANY_ID | | 32 | VENDER SPECIFIC | | 16 | VENDER SPECIFIC | |
| 63 | NAA | 5 | 47 | IEEE_COMPANY_ID | | 31 | VENDER SPECIFIC | x | 15 | VENDER SPECIFIC | x |
| 62 | NAA | | 46 | IEEE_COMPANY_ID | | 30 | VENDER SPECIFIC | | 14 | VENDER SPECIFIC | |
| 61 | NAA | | 45 | IEEE_COMPANY_ID | | 29 | VENDER SPECIFIC | | 13 | VENDER SPECIFIC | |
| 60 | IEEE_COMPANY_ID | | 44 | IEEE_COMPANY_ID | x | 28 | VENDER SPECIFIC | | 12 | VENDER SPECIFIC | x |
| 59 | IEEE_COMPANY_ID | x | 43 | IEEE_COMPANY_ID | | 27 | VENDER SPECIFIC | x | 11 | VENDER SPECIFIC | |
| 58 | IEEE_COMPANY_ID | | 42 | IEEE_COMPANY_ID | | 26 | VENDER SPECIFIC | | 10 | VENDER SPECIFIC | |
| 57 | IEEE_COMPANY_ID | | 41 | IEEE_COMPANY_ID | | 25 | VENDER SPECIFIC | | 9 | VENDER SPECIFIC | x |
| 56 | IEEE_COMPANY_ID | x | 40 | IEEE_COMPANY_ID | x | 24 | VENDER SPECIFIC | x | 8 | VENDER SPECIFIC | |
| 55 | IEEE_COMPANY_ID | | 39 | IEEE_COMPANY_ID | | 23 | VENDER SPECIFIC | | 7 | VENDER SPECIFIC | |
| 54 | IEEE_COMPANY_ID | | 38 | IEEE_COMPANY_ID | | 22 | VENDER SPECIFIC | | 6 | VENDER SPECIFIC | x |
| 53 | IEEE_COMPANY_ID | x | 37 | IEEE_COMPANY_ID | | 21 | VENDER SPECIFIC | | 5 | VENDER SPECIFIC | |
| 52 | IEEE_COMPANY_ID | | 36 | VENDER SPECIFIC | x | 20 | VENDER SPECIFIC | x | 4 | VENDER SPECIFIC | |
| 51 | IEEE_COMPANY_ID | | 35 | VENDER SPECIFIC | | 19 | VENDER SPECIFIC | | 3 | VENDER SPECIFIC | x |
| 50 | IEEE_COMPANY_ID | | 34 | VENDER SPECIFIC | | 18 | VENDER SPECIFIC | | 2 | VENDER SPECIFIC | |
| 49 | IEEE_COMPANY_ID | | 33 | VENDER SPECIFIC | | 17 | VENDER SPECIFIC | | 1 | VENDER SPECIFIC | |

[Fig. 14]

| BIT | FUNCTION | NO | BIT | FUNCTION | NO | BIT | FUNCTION | NO | BIT | FUNCTION | NO |
|---|---|---|---|---|---|---|---|---|---|---|---|
| 64 | NAA |  | 48 | IEEE_COMPANY ID |  | 32 | BLOCK ASSIGNMENT |  | 16 | S/N |  |
| 63 | NAA | 5 | 47 | IEEE_COMPANY ID | x | 31 | BLOCK ASSIGNMENT | x | 15 | S/N | x |
| 62 | NAA |  | 46 | IEEE_COMPANY ID |  | 30 | BLOCK ASSIGNMENT |  | 14 | S/N |  |
| 61 | NAA |  | 45 | IEEE_COMPANY ID |  | 29 | BLOCK ASSIGNMENT |  | 13 | S/N |  |
| 60 | IEEE_COMPANY ID |  | 44 | IEEE_COMPANY ID |  | 28 | BLOCK ASSIGNMENT |  | 12 | S/N |  |
| 59 | IEEE_COMPANY ID | x | 43 | IEEE_COMPANY ID | x | 27 | BLOCK ASSIGNMENT | x | 11 | S/N | x |
| 58 | IEEE_COMPANY ID |  | 42 | IEEE_COMPANY ID |  | 26 | BLOCK ASSIGNMENT |  | 10 | S/N |  |
| 57 | IEEE_COMPANY ID |  | 41 | IEEE_COMPANY ID |  | 25 | BLOCK ASSIGNMENT |  | 9 | S/N |  |
| 56 | IEEE_COMPANY ID |  | 40 | IEEE_COMPANY ID |  | 24 | PORT ID |  | 8 | S/N |  |
| 55 | IEEE_COMPANY ID | x | 39 | IEEE_COMPANY ID | x | 23 | PORT ID | x | 7 | S/N | x |
| 54 | IEEE_COMPANY ID |  | 38 | IEEE_COMPANY ID |  | 22 | S/N |  | 6 | S/N |  |
| 53 | IEEE_COMPANY ID |  | 37 | IEEE_COMPANY ID |  | 21 | S/N |  | 5 | S/N |  |
| 52 | IEEE_COMPANY ID |  | 36 | BLOCK ASSIGNMENT |  | 20 | S/N |  | 4 | S/N |  |
| 51 | IEEE_COMPANY ID | x | 35 | BLOCK ASSIGNMENT | x | 19 | S/N | x | 3 | S/N | x |
| 50 | IEEE_COMPANY ID |  | 34 | BLOCK ASSIGNMENT |  | 18 | S/N |  | 2 | S/N |  |
| 49 | IEEE_COMPANY ID |  | 33 | BLOCK ASSIGNMENT |  | 17 | S/N |  | 1 | S/N |  |

[Fig. 15]

| BIT | FUNCTION | NO | BIT | FUNCTION | NO | BIT | FUNCTION | NO | BIT | FUNCTION | NO |
|---|---|---|---|---|---|---|---|---|---|---|---|
| 64 | NAA |  | 48 | IEEE_COMPANY ID |  | 32 | VENDER SPECIFIC |  | 16 | VENDER SPECIFIC | x |
| 63 | NAA | 5 | 47 | IEEE_COMPANY ID |  | 31 | VENDER SPECIFIC | x | 15 | VENDER SPECIFIC |  |
| 62 | NAA |  | 46 | IEEE_COMPANY ID |  | 30 | VENDER SPECIFIC |  | 14 | VENDER SPECIFIC |  |
| 61 | NAA |  | 45 | IEEE_COMPANY ID |  | 29 | VENDER SPECIFIC |  | 13 | VENDER SPECIFIC | x |
| 60 | IEEE_COMPANY ID |  | 44 | IEEE_COMPANY ID |  | 28 | VENDER SPECIFIC | x | 12 | VENDER SPECIFIC |  |
| 59 | IEEE_COMPANY ID | x | 43 | IEEE_COMPANY ID |  | 27 | VENDER SPECIFIC |  | 11 | VENDER SPECIFIC |  |
| 58 | IEEE_COMPANY ID |  | 42 | IEEE_COMPANY ID |  | 26 | VENDER SPECIFIC |  | 10 | VENDER SPECIFIC | x |
| 57 | IEEE_COMPANY ID |  | 41 | IEEE_COMPANY ID |  | 25 | VENDER SPECIFIC |  | 9 | VENDER SPECIFIC |  |
| 56 | IEEE_COMPANY ID | x | 40 | IEEE_COMPANY ID |  | 24 | VENDER SPECIFIC | x | 8 | BOX_ID-8 |  |
| 55 | IEEE_COMPANY ID |  | 39 | IEEE_COMPANY ID |  | 23 | VENDER SPECIFIC |  | 7 | BOX_ID-7 |  |
| 54 | IEEE_COMPANY ID |  | 38 | IEEE_COMPANY ID |  | 22 | VENDER SPECIFIC |  | 6 | BOX_ID-6 | x |
| 53 | IEEE_COMPANY ID | x | 37 | IEEE_COMPANY ID |  | 21 | VENDER SPECIFIC |  | 5 | BOX_ID-5 |  |
| 52 | IEEE_COMPANY ID |  | 36 | VENDER SPECIFIC |  | 20 | VENDER SPECIFIC | x | 4 | BOX_ID-4 |  |
| 51 | IEEE_COMPANY ID |  | 35 | VENDER SPECIFIC |  | 19 | VENDER SPECIFIC |  | 3 | BOX_ID-3 | x |
| 50 | IEEE_COMPANY ID |  | 34 | VENDER SPECIFIC |  | 18 | VENDER SPECIFIC |  | 2 | BOX_ID-2 |  |
| 49 | IEEE_COMPANY ID |  | 33 | VENDER SPECIFIC |  | 17 | VENDER SPECIFIC |  | 1 | BOX_ID-1 |  |

[Fig. 16]
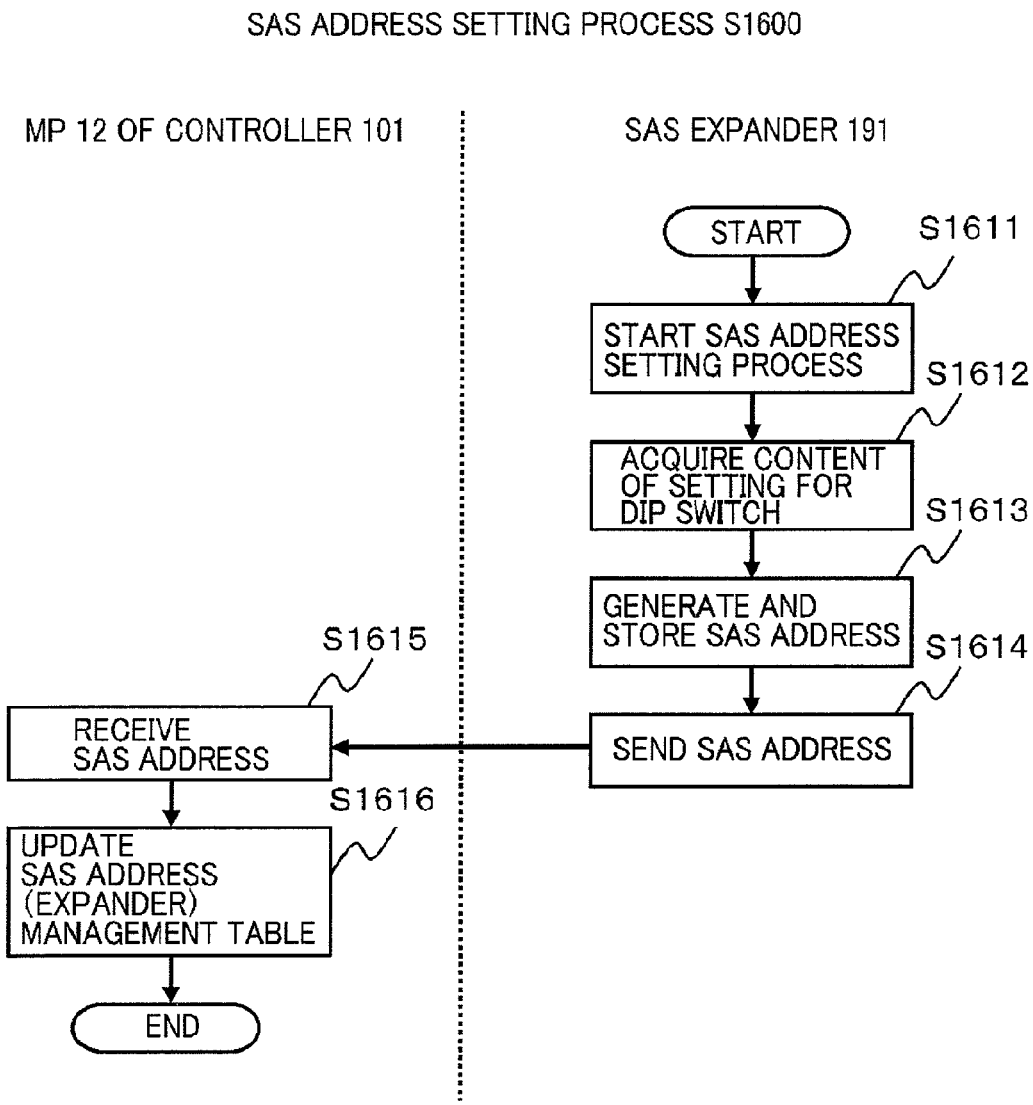

[Fig. 17]
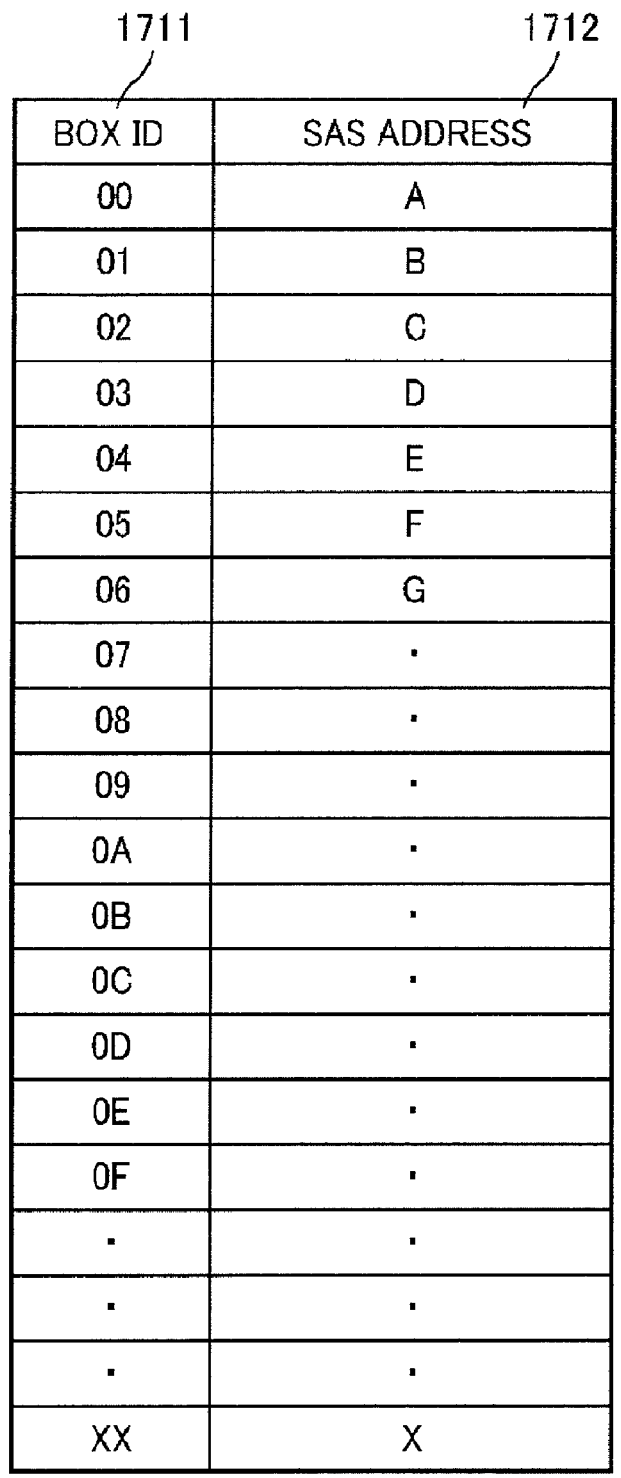
SAS ADDRESS MANAGEMENT TABLE 1700
| BOX ID | SAS ADDRESS |
|---|---|
| 00 | A |
| 01 | B |
| 02 | C |
| 03 | D |
| 04 | E |
| 05 | F |
| 06 | G |
| 07 | . |
| 08 | . |
| 09 | . |
| 0A | . |
| 0B | . |
| 0C | . |
| 0D | . |
| 0E | . |
| 0F | . |
| . | . |
| . | . |
| . | . |
| XX | X |

[Fig. 18]

PARAMETER MANAGEMENT TABLE 1800

| BOX ID | PORT ID | OUTPUT AMPLITUDE | PRE-EMPHASIS |
|---|---|---|---|
| 00 | 00 | 1111 | 0100 |
| 00 | 01 | 1111 | 1000 |
| 01 | 00 | 1000 | 1111 |
| 01 | 01 | 1000 | 1000 |
| 02 | 00 | 1111 | 1111 |
| 02 | 01 | 1000 | 0100 |
| 03 | 00 | . | . |
| 03 | 01 | . | . |
| 04 | 00 | . | . |
| 04 | 01 | . | . |
| 05 | 00 | . | . |
| 05 | 01 | . | . |
| 06 | 00 | . | . |
| 06 | 01 | . | . |
| 07 | 00 | . | . |
| 07 | 01 | . | . |
| . | . | . | . |
| . | . | . | . |
| . | . | . | . |
| XX | 01 | XXXX | XXXX |

[Fig. 19]

CABLE LENGTH MANAGEMENT TABLE 1900

| BOX ID | PORT ID | CABLE LENGTH |
|--------|---------|--------------|
| 00 | 00 | A |
| 00 | 01 | B |
| 01 | 00 | C |
| 01 | 01 | D |
| 02 | 00 | A |
| 02 | 01 | B |
| 03 | 00 | C |
| 03 | 01 | D |
| 04 | 00 | E |
| 04 | 01 | F |
| 05 | 00 | G |
| 05 | 01 | H |
| 06 | 00 | E |
| 06 | 01 | F |
| 07 | 00 | G |
| 07 | 01 | H |
| . | . | . |
| . | . | . |
| . | . | . |
| XX | 01 | X |

1911  1912  1913

[Fig. 20]
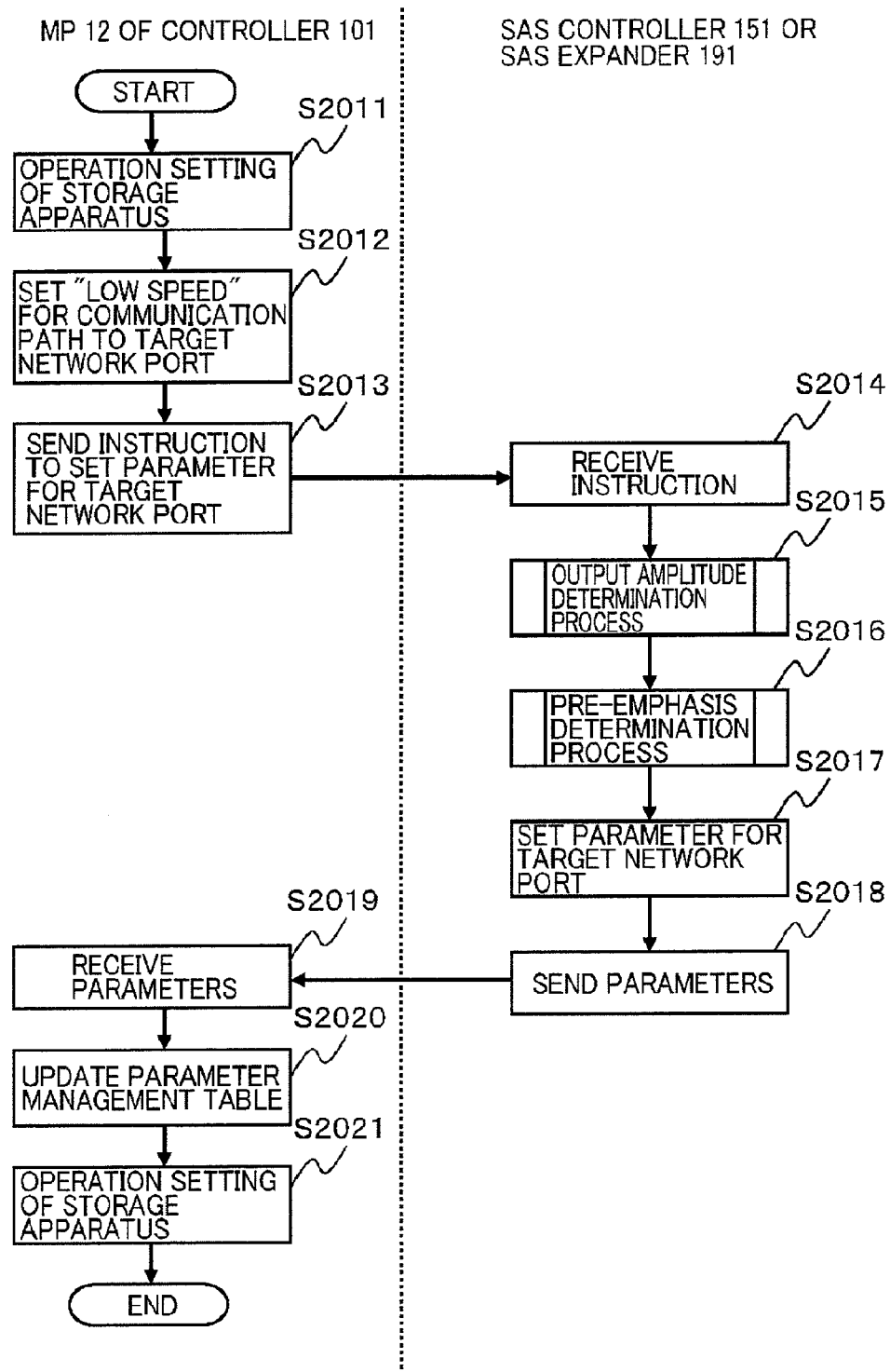

[Fig. 21]
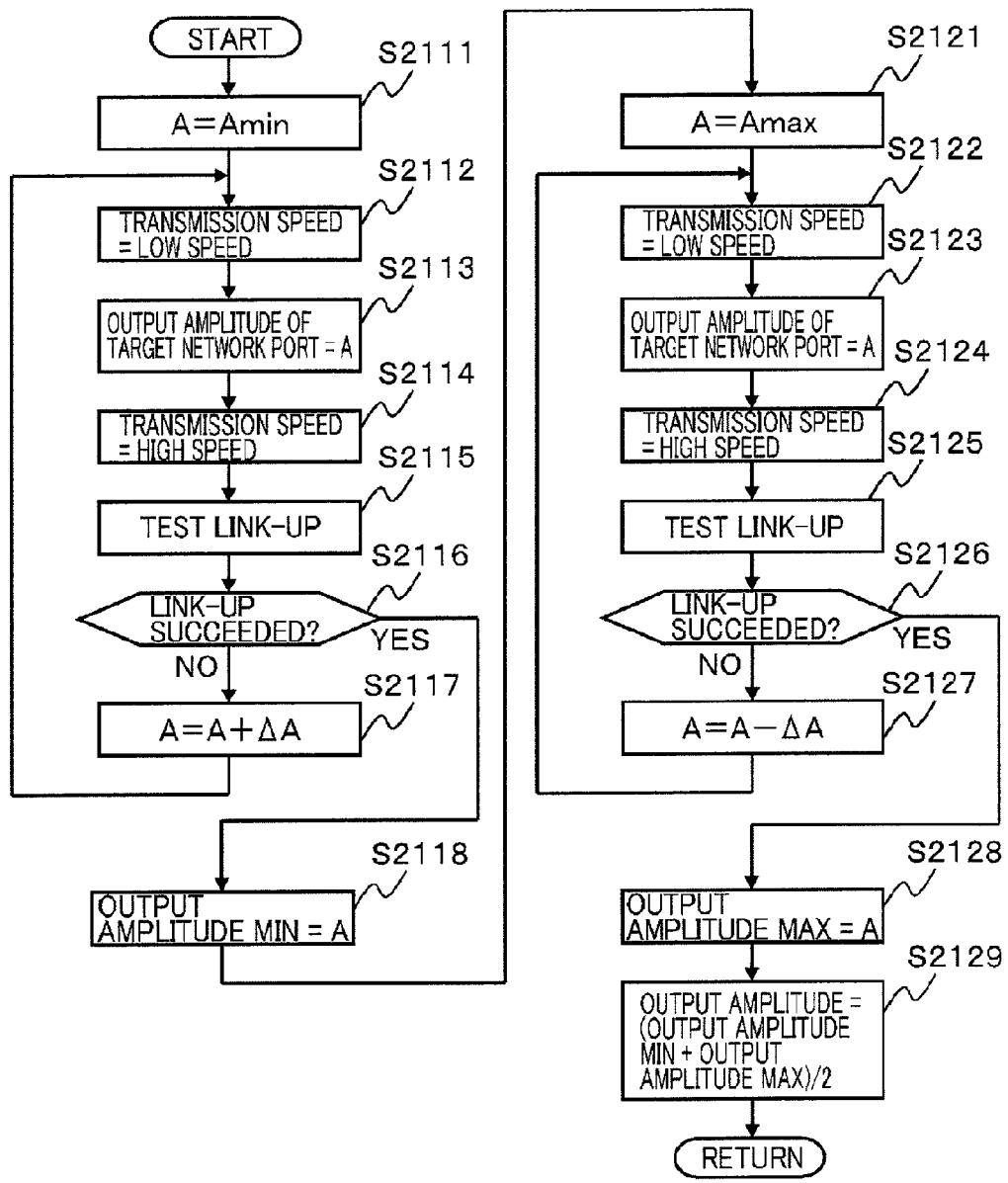

[Fig. 22]
PRE-EMPHASIS DETERMINATION PROCESS S2016
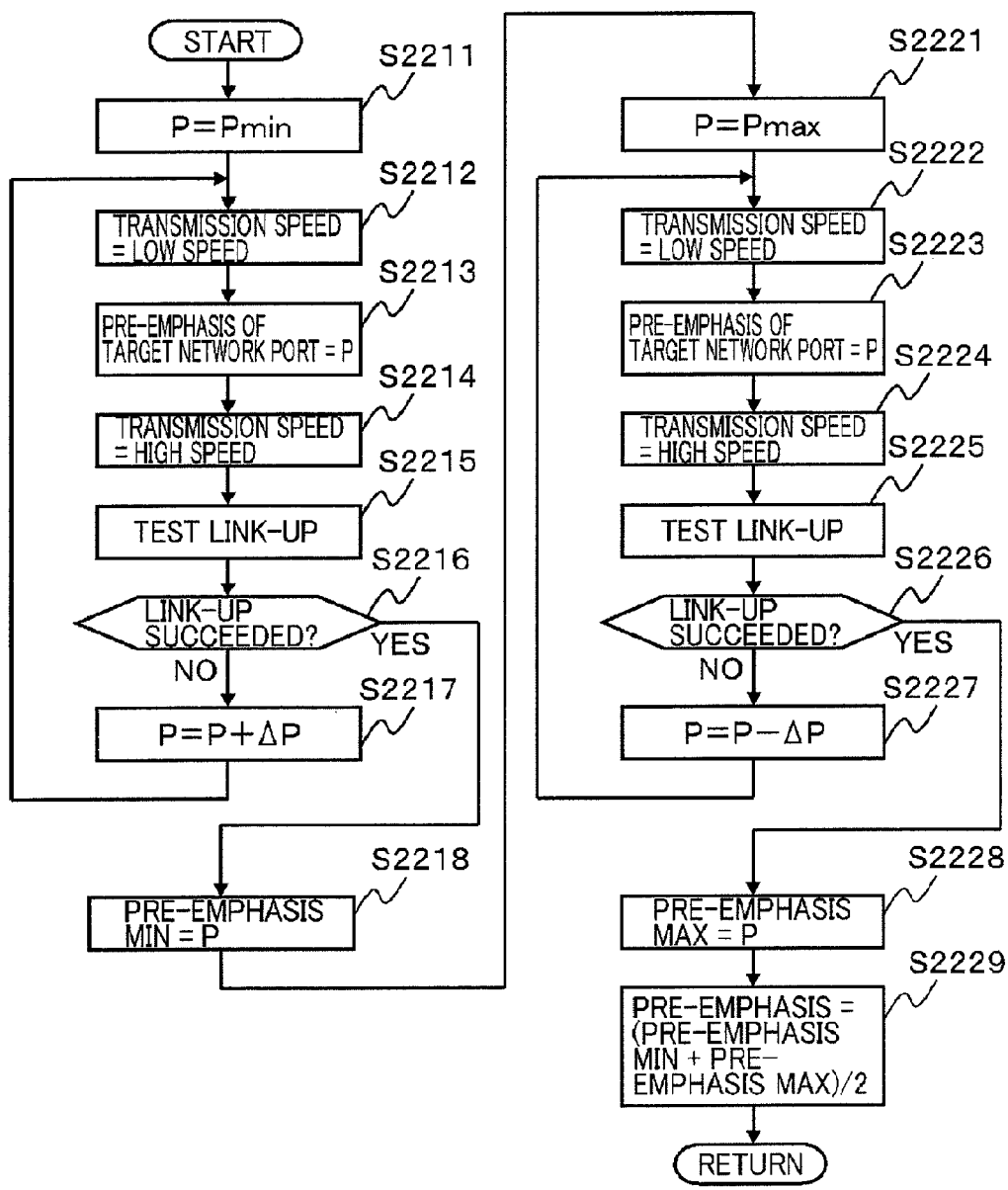

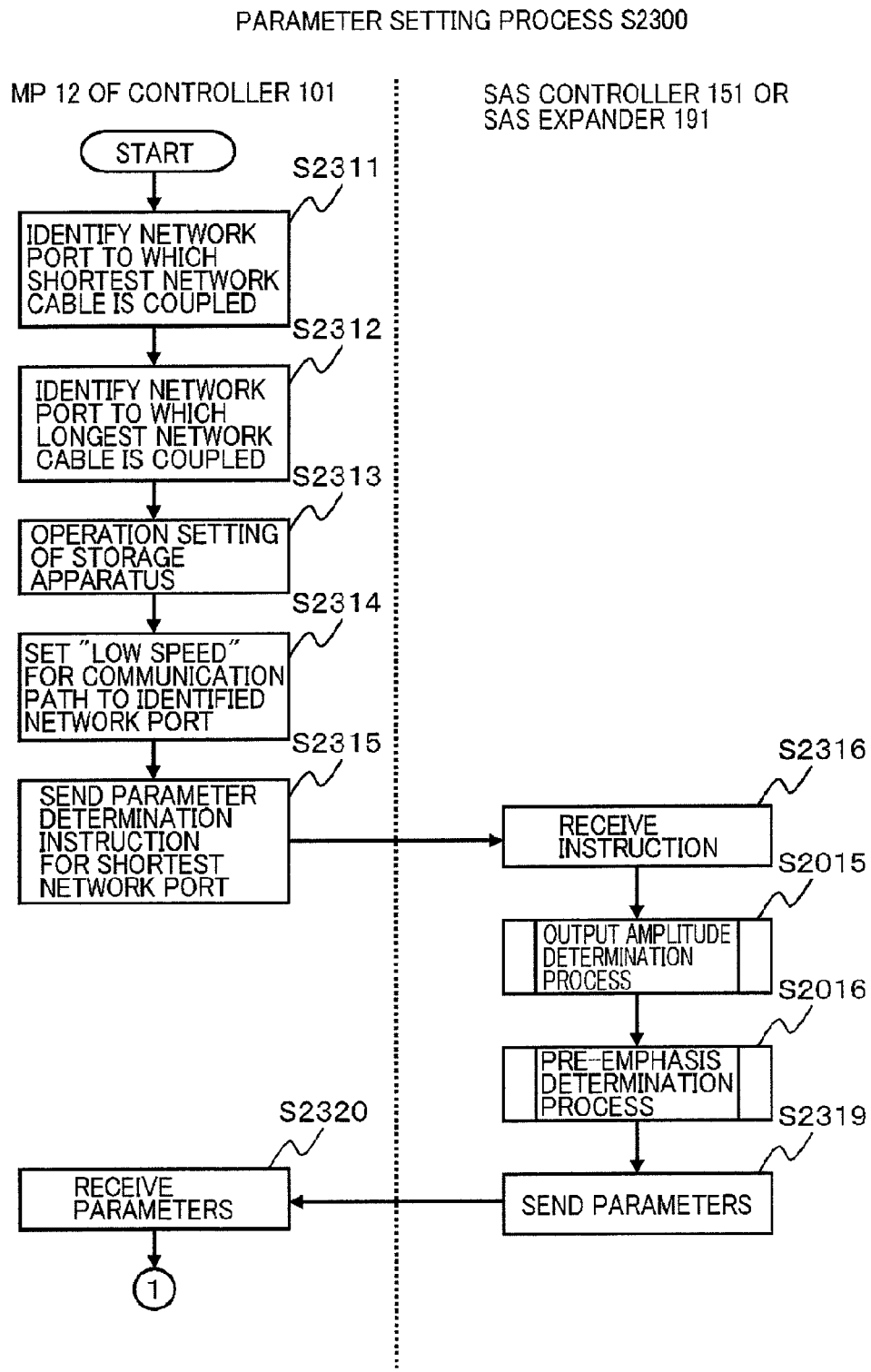

[Fig. 24]
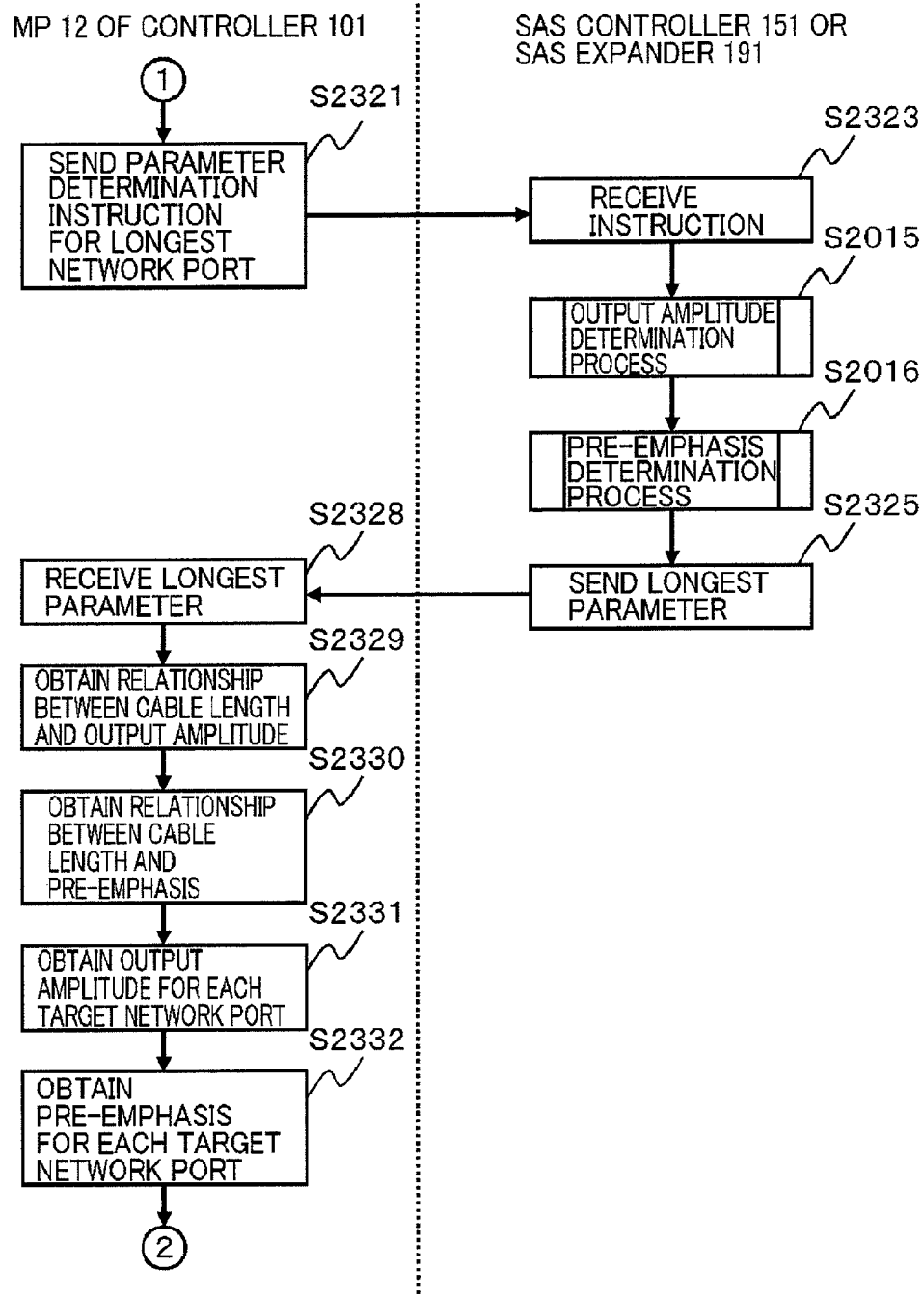

[Fig. 25]
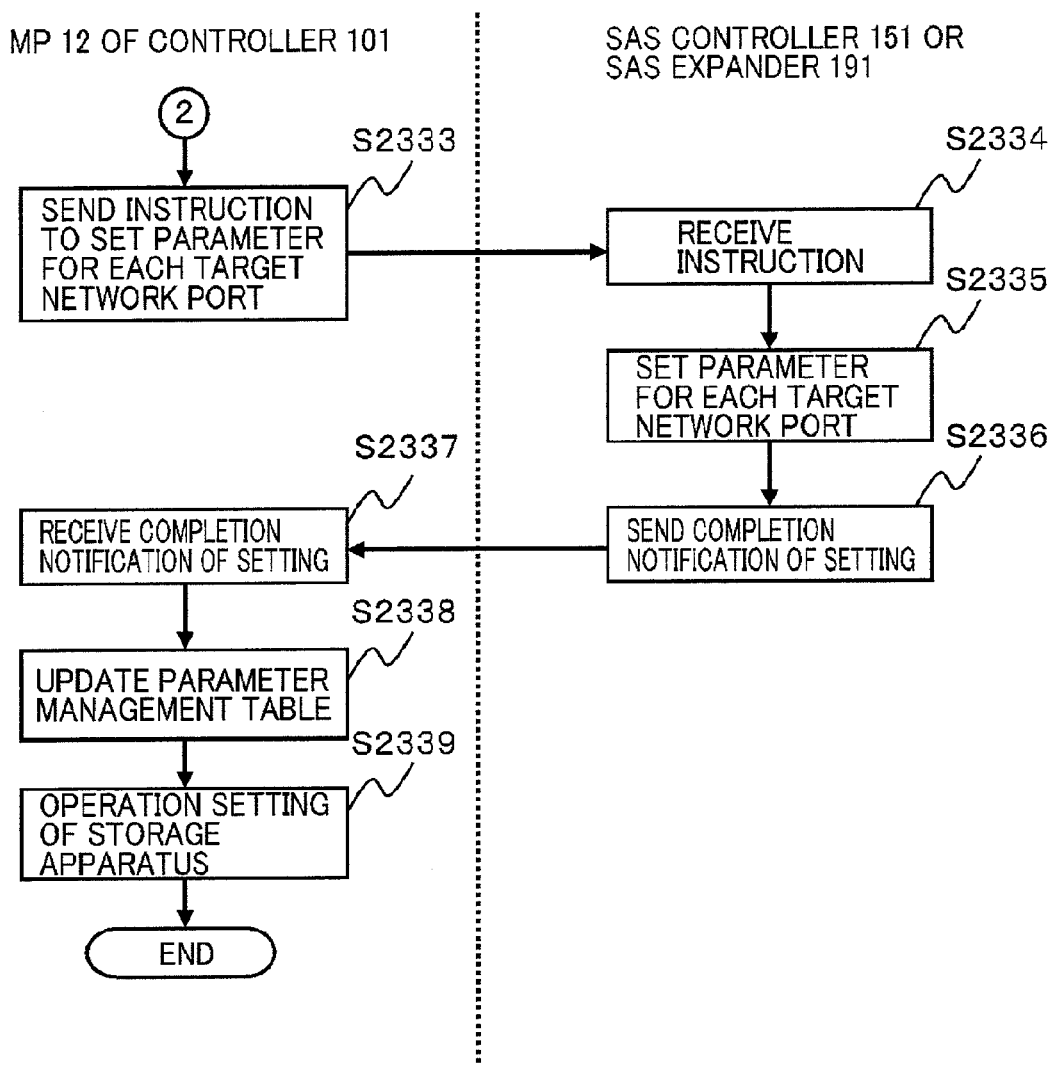

[Fig. 26]
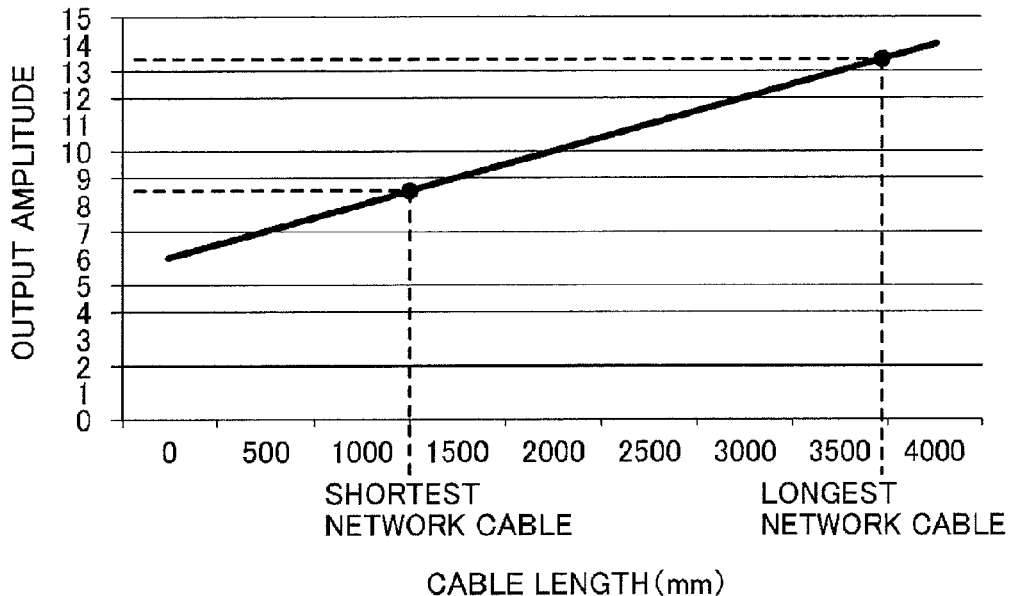
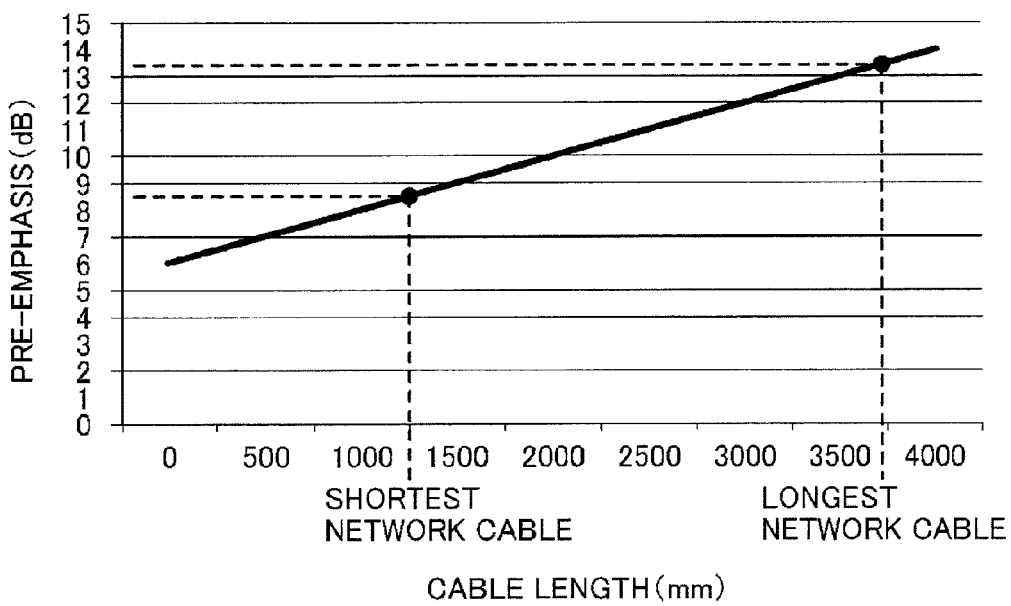

[Fig. 27]

(a) OUTPUT AMPLITUDE

| BOX ID | PORT ID | OUTPUT AMPLITUDE |
|---|---|---|
| 00 | 00 | 1111 |
| 00 | 01 | 1111 |
| 01 | 00 | 1000 |
| 01 | 01 | 1000 |
| 02 | 00 | 1111 |
| 02 | 01 | 1000 |
| 03 | 00 | . |
| 03 | 01 | . |
| 04 | 00 | . |
| 04 | 01 | . |
| 05 | 00 | . |
| 05 | 01 | . |
| 06 | 00 | . |
| 06 | 01 | . |
| 07 | 00 | . |
| 07 | 01 | . |
| . | . | . |
| . | . | . |
| . | . | . |
| XX | 01 | XXXX |

(b) PRE-EMPHASIS

| BOX ID | PORT ID | PRE-EMPHASIS |
|---|---|---|
| 00 | 00 | 0100 |
| 00 | 01 | 1000 |
| 01 | 00 | 1111 |
| 01 | 01 | 1000 |
| 02 | 00 | 1111 |
| 02 | 01 | 0100 |
| 03 | 00 | . |
| 03 | 01 | . |
| 04 | 00 | . |
| 04 | 01 | . |
| 05 | 00 | . |
| 05 | 01 | . |
| 06 | 00 | . |
| 06 | 01 | . |
| 07 | 00 | . |
| 07 | 01 | . |
| . | . | . |
| . | . | . |
| . | . | . |
| XX | 01 | XXXX |

[Fig. 28]
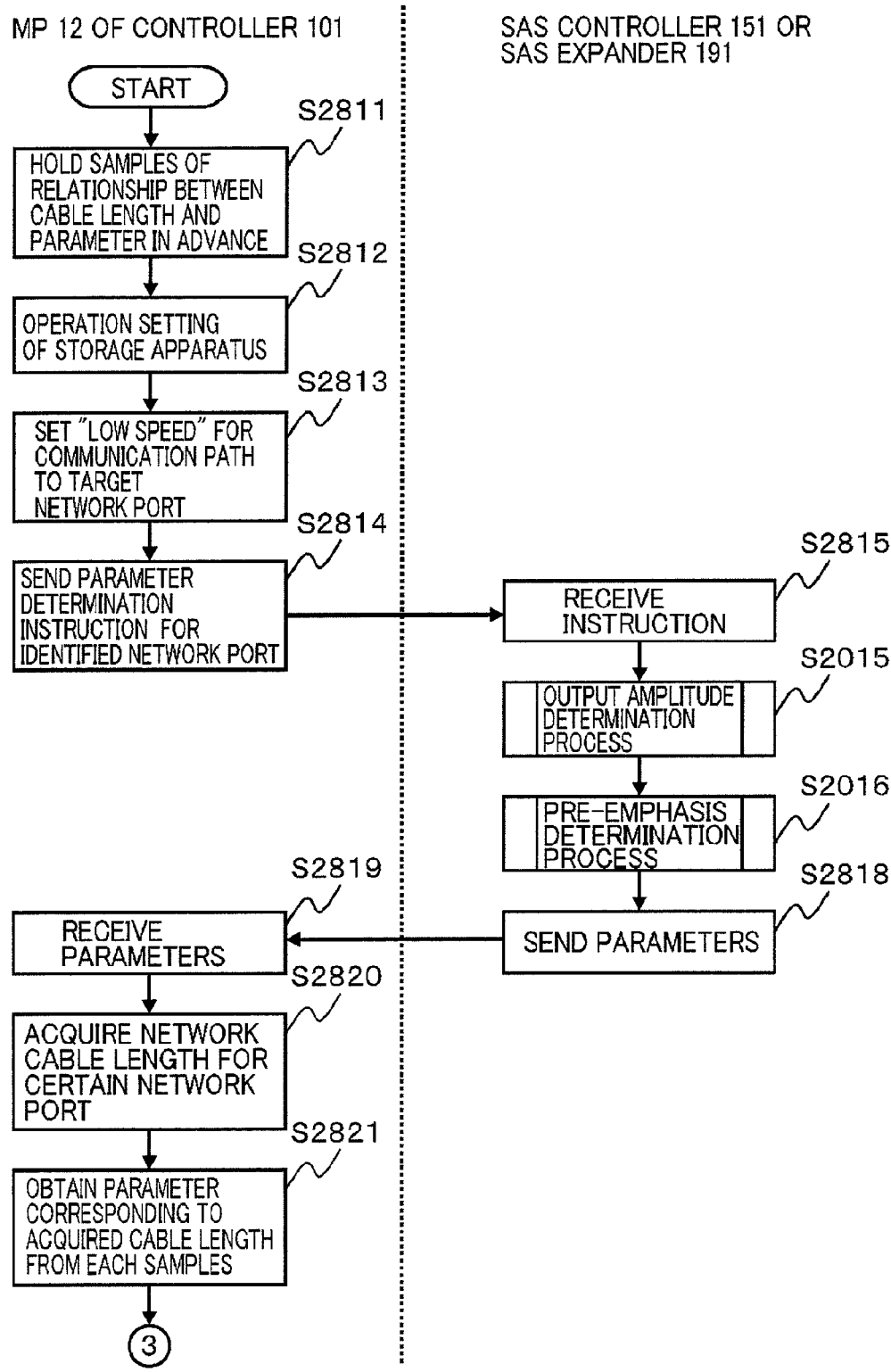

[Fig. 29]
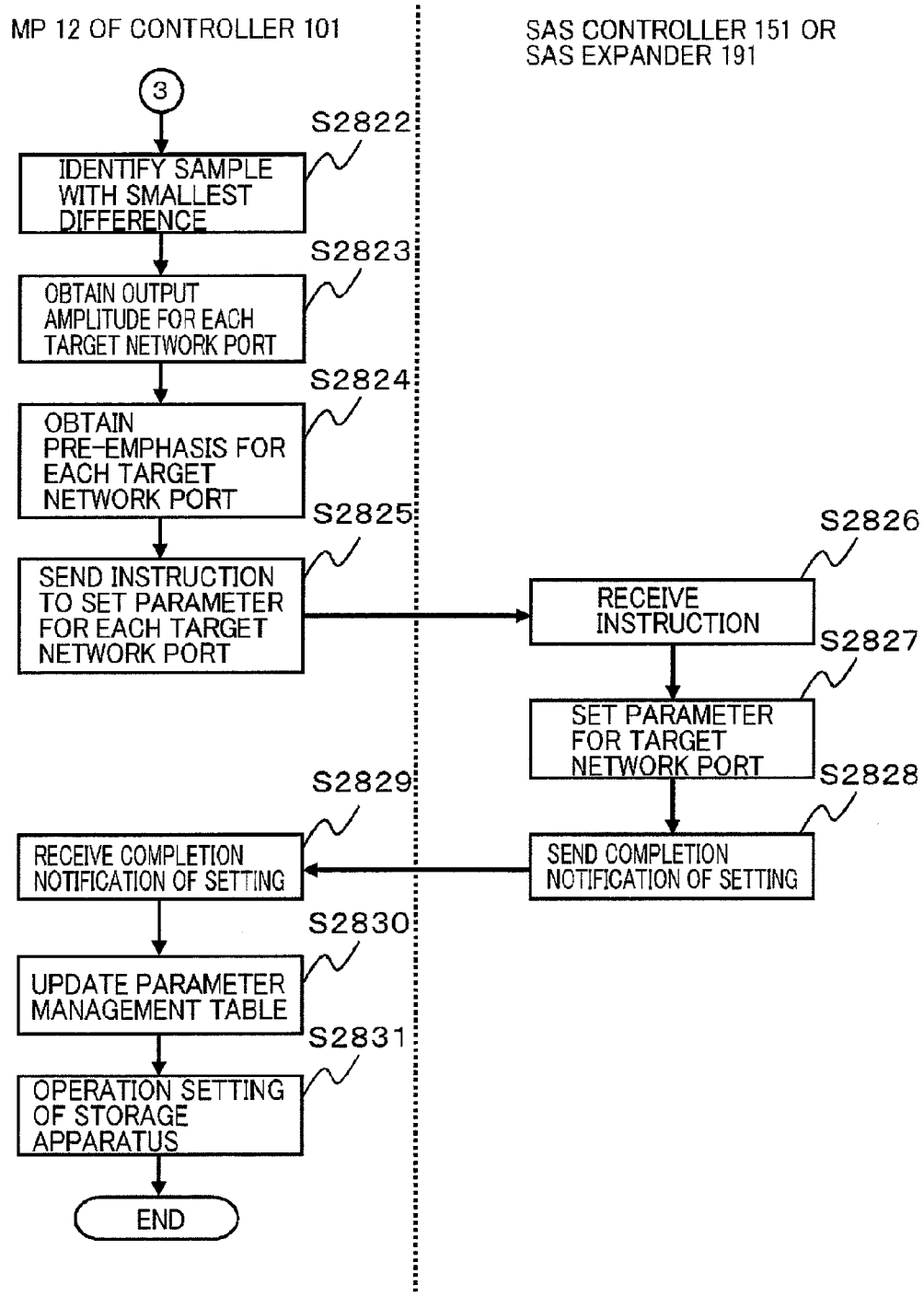

[Fig. 30]
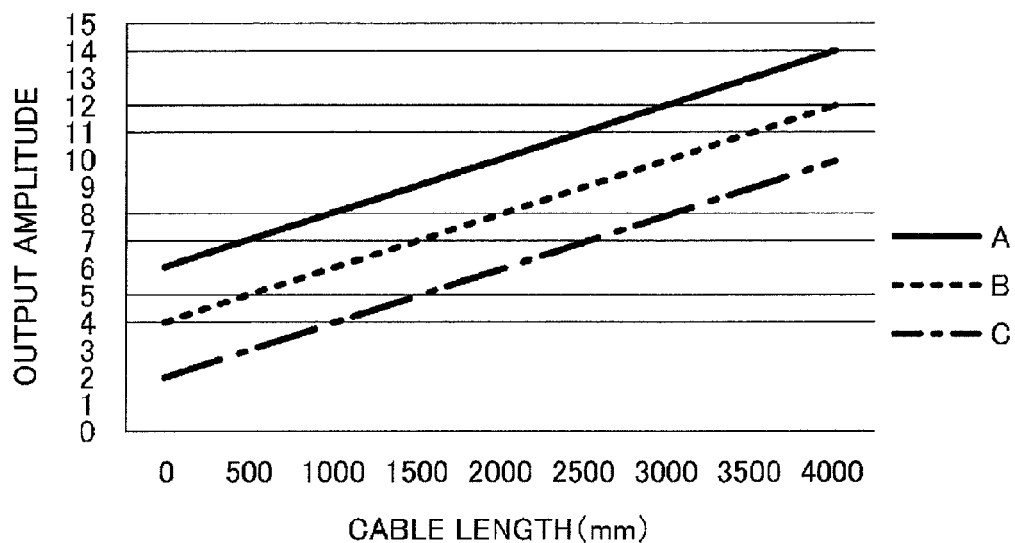
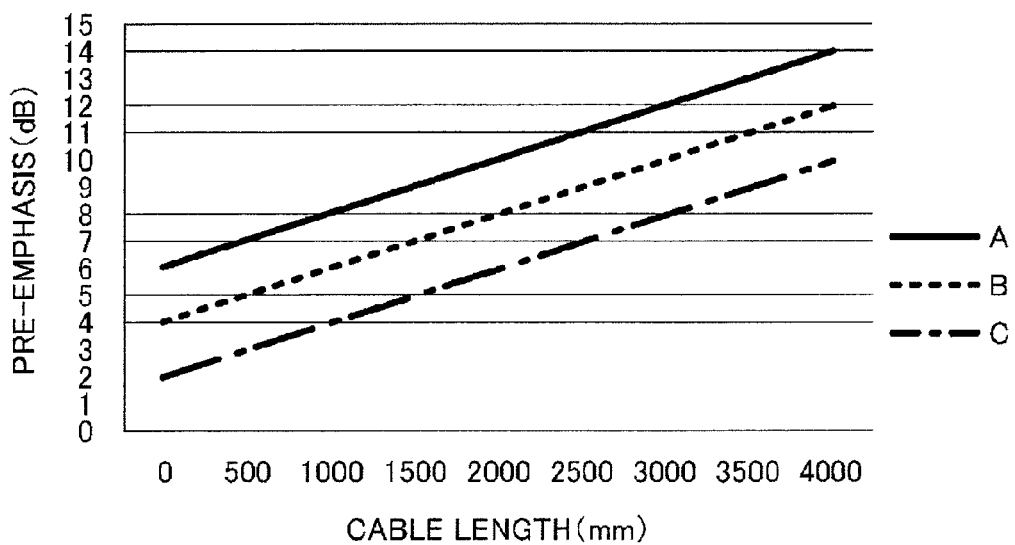

[Fig. 31]
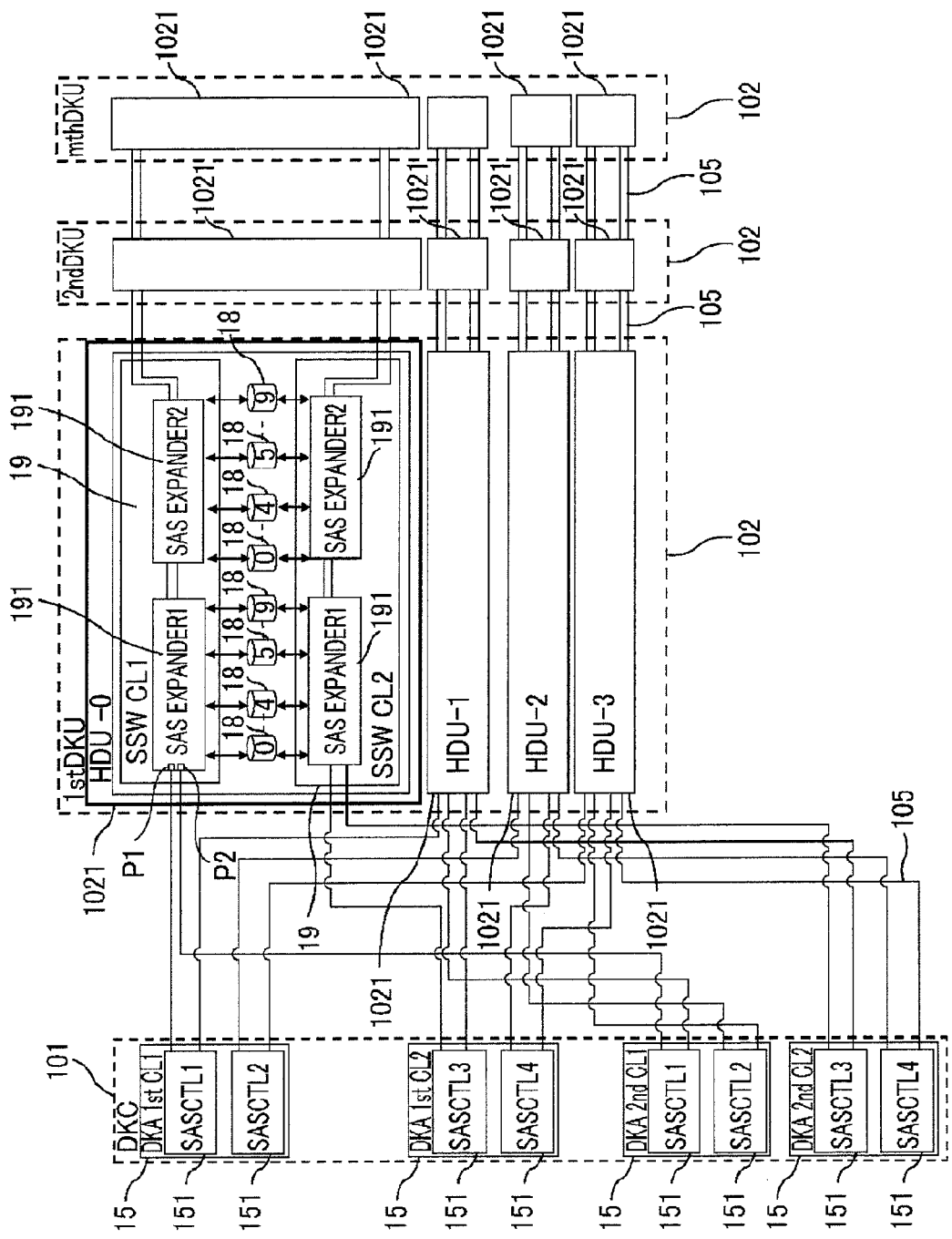

[Fig. 32]
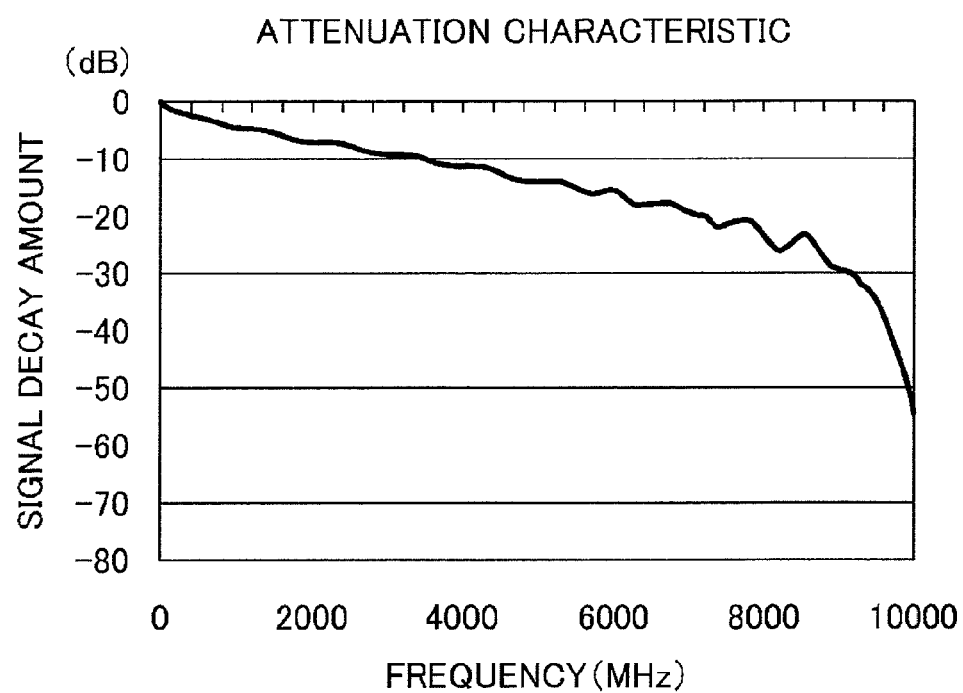

[Fig. 33]
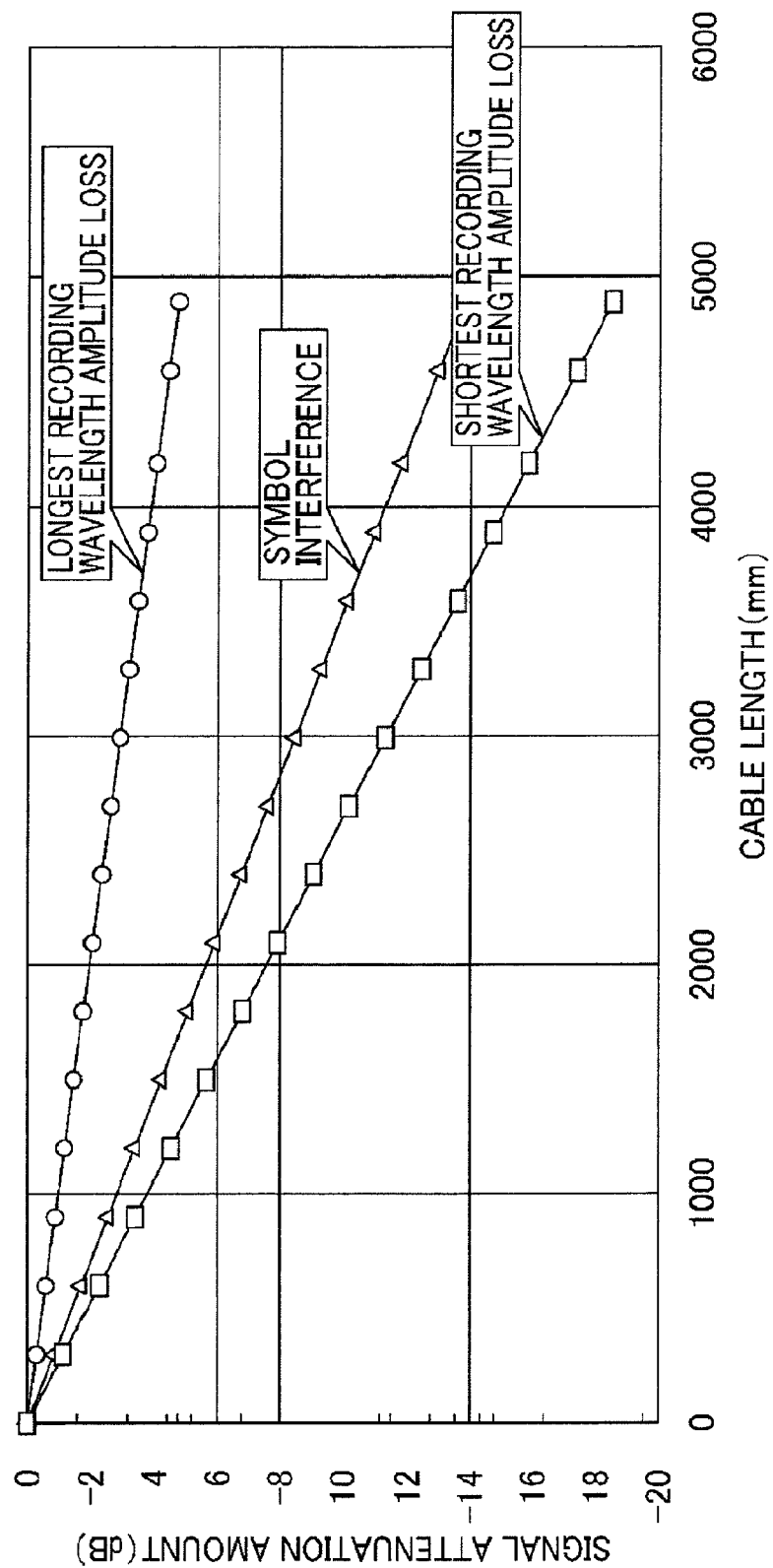

STORAGE APPARATUS AND METHOD OF CONTROLLING THE SAME

TECHNICAL FIELD

The present invention relates to a storage device and a method of controlling a storage apparatus.

BACKGROUND ART

PTL 1 discloses an automatic adjustment method of a serial interface circuit configured to adjust an output characteristic of a transmitter transmitting a signal to a serial interface. This method aims to perform the automatic adjustment of the transmitter without violating the protocol of the serial interface, and to this end includes: sequentially changing an output characteristic value of the transmitter; sending response frames added with information explicitly indicating retransmission of a frame to a coupled device with the output characteristic value thus changed via the serial interface; receiving the reception results of each of the plurality of response frames from the coupled device via the serial interface; and determining an adjustment value of the output characteristic value of the transmitter from the reception results of each of the response frames.

CITATION LIST

Patent Literature

PTL 1: Japanese Patent Application Laid-open Publication No. 2010-26651

SUMMARY OF INVENTION

Technical Problem

In a storage apparatus employing a serial communication method of SAS (Serial Attached SCSI) standards or the like, components such as hard disk drives and switches which are included in the storage apparatus are coupled (wire connected) to each other through metal cables. FIG. 32 shows an example of an attenuation characteristic of a metal cable (copper cable). As shown in the drawing, in the metal cable, as the transmission speed becomes faster, i.e., as the frequency of a transmission signal becomes higher, a skin effect and a dielectric loss increase to make the signal deterioration greater.

To suppress signal deterioration in the metal cable, it is effective to set appropriate parameters (output amplitude, pre-emphasis, and the like) for each of the network ports in consideration of the length of a cable coupled thereto. However, an operation load required for the individual setting of the parameters for multiple network ports included in the storage apparatus is a problem.

Conventionally, an upper limit of the transmission speed has been no more than about 4 Gbps, and difference in cable length among network cables coupled to respective network ports has been negligible. Thus, the setting of the parameters has been simplified by, for example, setting common average parameters for all the network ports. However, as proven by the fact, for example, that SAS compatible devices having transmission speeds of 12 Gbps and 24 Gbps are under development following those with 6 Gbps, the transmission speed of communications among components in a storage apparatus is expected to increase. The method of uniformly setting common parameters for all the network ports as described above may cause various problems such as transmission delay and frequent communication errors.

For example, FIG. 33 shows a relationship between the cable length of a metal cable and signal attenuation amount in the case of a transmission speed of 6 Gbps. As shown in FIG. 33, a difference between the longest recording wavelength amplitude loss and the shortest recording wavelength amplitude loss varies greatly depending on the cable length. For example, when the parameters (output amplitude and pre-emphasis) of a network port as a transmitter coupled to the longest cable is set such that the eye-pattern opening ratio in a network port as a receiver coupled to the longest cable can become largest, a network port as a receiver coupled to the shortest cable turns into an "over-equalized" state, and may have an increase in signal reflection and crosstalk noise, and malfunction of DFE (Decision Feedback Equalizer) may occur.

On the other hand, when the parameters of a network port as a transmitter coupled to the shortest cable is set such that the eye-pattern opening ratio in the network port as the receiver coupled to the shortest cable can become largest, the network port as the receiver coupled to the longest cable has an increase in ISI jitter and a decrease in the eye-pattern opening ratio, and thereby may cause communication errors frequently.

The present invention has been made in view of the aforementioned background, and an object of the present invention is to provide a storage apparatus capable of efficiently setting appropriate parameters for network ports included in the storage apparatus, and a method for controlling a storage apparatus.

Solution to Problem

An aspect of the present invention for achieving the object is a storage apparatus including a processor, a memory accessible by the processor, and at least one network device including at least one or more network ports to each of which a network cable configuring a communication path from the processor to a storage drive is coupled, the storage apparatus configured to receive an I/O request sent from an external apparatus, and perform I/O processing on the storage drive in accordance with the received I/O request, wherein the memory stores a first table being a table in which a network device ID being an identifier of the network device is associated with location information being information indicating a location of each of the network ports and stores a second table being a table in which a cable length of the network cable coupled to each of the network ports is associated with the location information and a port ID being an identifier of the network port, the processor stores a relationship between a cable length of the network cable and a parameter to be set for each of the network ports and determines the parameter to be set for each of the network ports by acquiring the cable length of the network cable coupled to the network port from the second table and acquiring the parameter corresponding to the acquired cable length from the relationship, and sets the thus determined parameter for the network port.

In addition to the above, problems disclosed in the present application and methods for solving the problems will be made clear by the descriptions in the section of Description of Embodiments, the drawings and others.

Advantageous Effects of Invention

According to the present invention, appropriate parameters can be efficiently set for the network ports included in the storage apparatus.

BRIEF DESCRIPTION OF DRAWINGS

FIG. 1 is a view showing a schematic configuration of storage system 1.

FIG. 2 is a view showing a configuration of host apparatus 3.

FIG. 3 is a view showing a configuration of storage apparatus 10.

FIG. 4 is a view showing a configuration of management apparatus 4.

FIG. 5 shows a coupling configuration of controller 101 and storage device units 102.

FIG. 6 is a view showing a configuration of a mounting substrate 60 of a DKA 15.

FIG. 7 is a view showing a configuration of SAS controller 151.

FIG. 8 is a view showing a configuration of mounting substrate 80 of SSW 19.

FIG. 9 is a view showing a configuration of the SAS expander 191.

FIG. 10 includes views showing a mounting state of components of drive units 1021 in chassis 500.

FIG. 11 is a view showing a configuration example of RAID groups.

FIG. 12 shows an example of RAID group management table 1200.

FIG. 13 shows a standard data format of a SAS address.

FIG. 14 shows a data format of a SAS address assigned to storage drive 18.

FIG. 15 shows a data format of a SAS address assigned to SAS expander 191.

FIG. 16 is a flowchart for explaining SAS address setting process S1600.

FIG. 17 shows an example of SAS address management table 1700.

FIG. 18 shows an example of parameter management table 1800.

FIG. 19 shows an example of cable length management table 1900.

FIG. 20 is a flowchart for explaining parameter setting process S2000.

FIG. 21 is a flowchart for explaining output amplitude determination process S2015.

FIG. 22 is a flowchart for explaining pre-emphasis determination process S2016.

FIG. 23 is a flowchart for explaining parameter setting process S2300.

FIG. 24 is a flowchart for explaining parameter setting process S2300.

FIG. 25 is a flowchart for explaining parameter setting process S2300.

FIG. 26 is a graph showing an example of a relationship between cable length and output amplitude and an example of a relationship between cable length and pre-emphasis.

FIG. 27 is a view showing an example of the output amplitudes and pre-emphases.

FIG. 28 is a flowchart for explaining parameter setting process S2800.

FIG. 29 is a flowchart for explaining parameter setting process S2800.

FIG. 30 shows examples of parameters (samples) stored in SM 14 in advance.

FIG. 31 shows coupling configuration of controller 101 and storage device units 102.

FIG. 32 is a view showing a relationship between the cable length and the output amplitude.

FIG. 33 shows an example of an attenuation characteristic of a metal cable.

DESCRIPTION OF EMBODIMENTS

FIG. 1 shows a schematic configuration of a storage system 1 described as an embodiment. As shown in the drawing, the storage system 1 includes one or more host apparatuses 3, one or more storage apparatuses 10, and one or more management apparatuses 4.

Each of the host apparatuses 3 is, for example, an information apparatus (computer) which provides a service such as an automated teller service of a bank or a browsing service of web pages on the Internet. The host apparatus 3 is, for example, a personal computer, a mainframe, an office computer, or the like. Each of the storage apparatuses 10 is an apparatus which provides storage areas for data to applications in the host apparatuses 3, and is for example a disk array apparatus.

The host apparatuses 3 are communicably coupled to each of the storage apparatuses 10 via a first communication network 5. The first communication network 5 is, for example, a LAN (Local Area Network), a WAN (Wide Area Network), a SAN (Storage Area Network), the Internet, a public communication network, a private line, or the like.

The management apparatuses 4 are communicably coupled to each of the storage apparatuses 10 via a second communication network 6. The second communication network 6 is, for example, a LAN, a WAN, the Internet, a public communication network, a private line, or the like.

Communication between the host apparatuses 3 and the storage apparatuses 10 is performed, for example, in compliance with a protocol such as TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark).

FIG. 2 shows a configuration of the host apparatus 3. As shown in the drawing, the host apparatus 3 includes a CPU 31 (CPU: Central Processing Unit), a memory 32 (RAM (Random Access Memory), ROM (Read Only Memory), NVRAM (Non Volatile RAM), or the like), a storage device 33 (HDD (Hard Disk Drive), a semiconductor storage device (SSD (Solid State Drive), or the like), and a communication interface (hereinafter, referred to as network I/F 34). The network I/F 34 is an interface used for coupling to the first communication network 5, and is, for example, a HBA (Host Bus Adapter), a NIC (Network Interface Card), or the like.

Programs for implementing an operating system (hereinafter, referred to as OS 321), a device driver 322, an application 323, and the like are stored in the memory 32 (or the storage device 33) of the host apparatus 3. The CPU 31 reads and executes the programs stored in the memory 32 (or the storage device 33), and various functions provided by the host apparatus 3 are thereby implemented.

FIG. 3 shows a configuration of the storage apparatus 10. As shown in the drawing, the storage apparatus 10 is configured by including a controller 101 (DKC (DisK Controller)) housed in a basic chassis and one or more storage device units 102 (DKU (DisK Units)) housed in an expanded chassis and coupled in cascade to the controller 101.

As shown in FIG. 3, the controller 101 includes one or more network I/Fs (hereinafter, referred to as CHAs 11 (CHA: Channel Adaptor)), one or more micro-processors (hereinafter, referred to as MPs 12 (MP: Micro Processor)), a cash memory (hereinafter, referred to as CM 13 (CM: Cache Memory)), a shared memory (hereinafter, referred to as SM 14 (SM: Shared Memory)), one or more disk adaptors (hereinafter, referred to as DKAs 15 (DKA: Disk Adaptor)), coupling devices 16, and a service device (hereinafter, referred to as SVP 17 (SVP: SerVice Processor).

Each of the CHAs 11 is a communication interface for performing communication with an external apparatus such as the host apparatus 3 via the first communication network 5. An I/O request sent from the host apparatus 3 is received by the CHA 11. Moreover, a response (for example, data read from the storage device unit 102 or a completion report of writing data to the storage device unit 102) of processing performed in response to the I/O request is sent from the CHA 11 to the host apparatus 3.

Each MPs 12 is formed by using a CPU (Central Processing Unit), a MPU (Micro Processing Unit), a DMA (DMA: Direct Memory Access), or the like. The MP 12 performs data transfer among the CHAs 11, the CM 13, the SM 14, and the DKAs 15. This data transfer is performed, for example, when data read from the storage device unit 102 (hereinafter, referred to as read data) is delivered, when data to be written to the storage device unit 102 (hereinafter, referred to as write data) is delivered, when data is staged in the CM 13 (data in the storage device unit 102 is read to the CM 13), when data stored in the CM 13 is destaged (data is written from the CM 13 to the storage device unit 102), and the like.

The CM 13 (cash memory) is configured by using a RAM, a ROM, a NVRAM, or the like. For example, target data for the I/O request is temporarily stored in the CM 13. The SM 14 is configured by using a RAM, a ROM, a NVRAM, or the like. For example, data used to control processing related to the I/O request (hereinafter, referred to as control information) and the like is stored in the SM 14.

Each of the DKAs 15 performs communication with the storage device unit 102 when data is read from the storage device unit 102 and when data is written to the storage device unit 102.

Each of the coupling devices 16 is a device (switch) which relays communication performed among the CHAs 11, the MPs 12, the CM 13, the SM 14, the DKAs 15, and the SVP 17. The coupling device 16 is configured by using a high-speed cross bar switch and the like.

The SVP 17 is configured using a personal computer, an office computer, or the like. The SVP 17 is communicably coupled to components (CHAs 11, MPs 12, CM 13, SM 14, DKAs 15, storage device units 102) of the storage apparatus 10 via the coupling devices 16 or communication means different from the coupling devices 16. Moreover, the SVP 17 includes a communication interface to couple to the second communication network 6, and communicates with the management apparatus 4 via the second communication network 6.

The SVP 17 acquires information on setting, performance, state, and the like of the storage apparatus 10 from the storage apparatus 10 whenever necessary, and provides the acquired information to the management apparatus 4 whenever necessary. Moreover, the SVP 17 executes processing related to setting, control, monitoring, and the like of the storage apparatus 10 spontaneously, or passively in response to an instruction from the management apparatus 4.

Each of the storage device units 102 is configured by including one or more storage drives 18 being physical storage media. Each of the storage drives 18 is, for example, a hard disk drive, a semiconductor storage device (SSD), or the like. The storage drive 18 performs communication with the DKAs 15 in compliance with a standard such as SAS interface (Serial Attached SCSI), SATA (Serial ATA), FC (Fibre Channel), PATA (Parallel ATA), or SCSI. Note that, the storage apparatus 10 includes at least one storage drive 18 which has a SAS interface (Serial Attached SCSI).

The storage apparatus 10 forms logical devices (LDEVs (LDEV: Logical Device) by using RAID (Redundant Arrays of Inexpensive (or Independent) Disks) groups (parity groups)) based on storage areas of the storage drives 18. The storage apparatus 10 provides the host apparatuses 3 with storage areas in units of logical storage areas (hereinafter, referred to as LUs (Logical Units, Logical Volumes)) (storage volumes) formed using the LDEVs. The storage apparatus 10 manages the correspondence between the LUs and the LDEVs.

A unique identifier (hereinafter, referred to as LUN (Logical Unit Number)) is assigned to each of the LUs. Each of the host apparatuses 3 sets a LUN and a block address in a frame to be sent to the storage apparatus 10, and thus the storage apparatus 10 is specified of a storage area to be accessed. When receiving the I/O request from the host apparatus 3, the storage apparatus 10 identifies the LDEV corresponding to the specified LU, and executes, on the LDEV, processing specified in the I/O request.

The storage drives 18 included in each storage device unit 102 are each coupled to one or more coupling devices (hereinafter, referred to as SSWs 19 (SSW: SAS Switch)) included in the storage device unit 102. The SSWs 19 of the storage device unit 102 in the uppermost level (coupled directly to the controller 101) among the storage device units 102 coupled to the controller 101 in cascade are coupled to the DKAs 15 of the controller 101. Moreover, the SSWs 19 of each of the storage device units 102 other than that in the uppermost level are coupled to the SSWs 19 of the storage device unit 102 in a lower level or in an upper level.

Each of the management apparatuses 4 shown in FIG. 1 is an information apparatus (computer) which performs setting, control, monitoring, and the like of the storage apparatuses 10. FIG. 4 shows the configuration of the management apparatus 4. As shown in the drawing, the management apparatus 4 includes a CPU 41, a memory 42 (RAM, ROM, NVRAM or the like), a storage device 43 (HDD, semiconductor storage device (SSD), or the like), a communication interface (hereinafter, referred to as network I/F 45) (NIC or the like), and a user interface (hereinafter, referred to as UI 46) (keyboard, mouse, touch panel, liquid crystal monitor, organic electroluminescence panel, and the like).

Programs such as an operating system (hereinafter, referred to as OS 421), a device driver 422, and management software (hereinafter, referred to as management software 423) are stored in the memory 42 (or the storage device 43) of the management apparatus 4. The management software 423 acquires information on setting, performance, and state of the storage apparatus 10 from the storage apparatus 10, and provides the acquired information to a user (manager of the storage apparatus 10 or the like). Moreover, the management software 423 performs communication with the SVP 17 spontaneously or passively in response to an instruction received from the user via the UI 46, and executes processing related to setting, control, and monitoring of the storage apparatus 10.

Before accessing the storage area provided by the storage apparatus 10, the host apparatus 3 sends the storage apparatus 10 a frame including the I/O request (data write request, data read request, or the like). The frame sent from the host apparatus 3 to the storage apparatus 10 is, for example, a frame (FC frame) of Fibre Channel.

When receiving the I/O request sent from the host apparatus 3, the storage apparatus 10 performs processing as follows in accordance with the type of the I/O request. For example, when the I/O request including data write request is received from the host apparatus 3, first the CHA 11 of the storage apparatus 10 notifies the MP 12 of the request. The MP 12 having received the notification from the CHA 11 generates a drive write request based on the data write request in the frame, and stores the drive write request in the CM 13. In addition, the MP 12 responds to the CHA 11 by sending a reception notification of the aforementioned notification. Moreover, the MP 12 sends the DKA 15 the generated drive write request.

When receiving the response from the MP 12, the CHA 11 sends a completion report to the host apparatus 3. When receiving the drive write request from the MP 12, the DKA 15 registers the received drive write request in a write process queue.

The DKA 15 reads the drive write request from the write process queue whenever necessary. The DKA 15 reads write data specified in the read drive write request from the CM 13, writes the read write data in the storage drive 18, and notifies the MP 12 of a report (completion report) reporting that the writing of the write data which has been performed based on the drive write request is completed. The MP 12 receives the completion report sent from the DKA 15.

Moreover, for example, when receiving the I/O request including the data read request from the host apparatus 3, the CHA 11 of the storage apparatus 10 notifies the DKA 15 of the reception. When receiving the notification from the CHA 11, the DKA 15 reads from the storage drive 18 data (for example, data specified by LBA (Logical Block Address)) specified in the data read request included in the frame. Note that, when the read data exists in the CM 13 (when data is staged), data reading from the storage drive 18 is omitted.

The MP 12 writes the data read by the DKA 15 to the CM 13, and sends the data having written to the CM 13 to the CHA 11 whenever necessary.

The CHA 11 receives the read data sent from the MP 12, and sends the received read data to the host apparatus 3. When the sending of the read data to the host apparatus 3 is completed, the CHA 11 sends completion report to the host apparatus 3.

FIG. 5 shows a coupling configuration of the controller 101 and the storage device units 102 forming the storage apparatus 10. As shown in the drawing, the storage device unit 102 (1st DKU in FIG. 5) includes one or more drive units 1021 ("HDU-0", "HDU-1", "HDU-2", and "HDU-3" in FIG. 5). Moreover, each of the drive units 1021 includes storage drives 18 and SSWs 19.

As shown in FIG. 5, the SSWs 19 are configured to be redundantly provided for the storage drives 18. For example, two SSWs 19 ("SSW CL1" and "SSW CL2") are redundantly provided for the storage drives 18 ("0", "4", "5", and "9"). As shown in FIG. 5, each of the SSWs 19 includes one or more SAS expanders 191 ("SAS EXPANDER 1" and "SAS EXPANDER 2" in FIG. 5) (network devices).

As shown in FIG. 5, each of the DKAs 15 ("DKA 1st CL1" and "DKA 1st CL2" in FIG. 5) of the controller 101 (DKC) includes one or more SAS controllers 151 ("SASCTL 1", "SASCTL 2", "SASCTL 3", and "SASCTL 4" in FIG. 5) (network devices). Each of the SAS controllers 151 is coupled to the SAS Expanders 191 of the storage device unit 102 via network cables 105 (metal cables (copper cables or the like).

As shown in FIG. 5, the SAS expanders 191 ("SAS EXPANDER 1" and "SAS EXPANDER 2") of a certain storage device unit 102 ("1st DKU") are coupled to the SAS expanders 191 included in a different storage device unit 102 ("2nd DKU") via the network cables 105, the different storage device unit 102 being in a level lower than the certain storage device unit 102 and coupled thereto in cascade.

FIG. 6 shows a configuration of a mounting substrate 60 of DKA 15. The mounting substrate 60 shown in the drawing is attached to a back board 61 provided in a chassis of the controller 101. The mounting substrate 60 includes one or more SAS controllers 151, one or more local routers 152 (LR: Local Router), one or more memories 153, a plurality of connectors 155 used to attach and wire-connect the mounting substrate 60 to sockets 62 provided to the back board 61, jacks 156 for coupling to the network cables 105 are provided in a peripheral portion of the mounting substrate 60, and the like. Note that, dot and dash lines shown in the drawing indicate main wirings wire-connecting the components mounted on the mounting substrate 60 to each other.

Each of the SAS controllers 151 includes a communication interface for performing communication with the SAS expanders 191, and processes data sent from the local router 152 and the storage drives 18. The local router 152 controls the data communication performed between the CM 13 and the storage drives 18, such as routing and providing received commands and data to the MPs 12.

Each of the memories 153 is configured by using a RAM, a ROM, a NVRAM, or the like. Various kinds of data and programs (for example, an activation program for booting the SAS controller 151, and the like) are stored in the memory 153.

FIG. 7 shows a configuration of each of the SAS controllers 151. As shown in the drawing, the SAS controller 151 includes a SAS processor 1511, a communication control processor 1512, a memory 1513, and the like.

The SAS processor 1511 includes a plurality of network ports 1514 for communicating with the SAS expanders 191. The SAS processor 1511 controls communication with the SAS expanders 191. The communication control processor 1512 is coupled to the local router 152 via a network port 1515. The communication control processor 1512 controls communication with the local router 152.

Each of the network ports 1514 of the SAS processor 1511 includes a transfer unit (Tx), a receiving unit (Rx), a buffer, an error detection circuit, and the like. Among these components, the buffer temporarily stores a received frame or a transferred frame. The error detection circuit monitors a communication error in the network port 1514. The error detection circuit, for example, checks a parity of the frame received or transferred by the network ports 1514, and, when the parity matches a certain error pattern, increments a value of an error counter corresponding to the error pattern. Note that, an identifier (hereinafter, referred to as port ID) unique at least within the DKA 15 is assigned to each of the network ports 1514.

Each of the network ports 1514 of the SAS processor 1511 can be set with parameters such as a transmission speed (data transfer rate) (3 Gbps, 6 Gbps, or the like) of communication performed using the network port 1514, an output amplitude of signals outputted from the network port 1514, and a pre-emphasis of signals outputted from the network port 1514.

Setting the parameters for each of the network ports 1514 can be performed from the SVP 17. The SAS processor 1511 sets the parameters for each of the network ports 1514 in accordance with an instruction from the SVP 17. The SAS processor 1511 manages, in the memory 1513, the parameters currently set for each of the network ports 1514 and a SAS address (described later) assigned to the SAS controller 151.

FIG. 8 shows the configuration of a mounting substrate 80 of the SSWs 19. The mounting substrate 80 is attached to a back board 81 provided in a chassis of the storage device unit 102. As shown in the drawing, the mounting substrate 80 includes one or more SAS expanders 191, one or more memories 193, one or more network ports 194, DIP switches 195 (may be other means such as jumper settings), a plurality of connectors 196, and the like. The DIP switches 195 are provided for the SAS expanders 191, respectively, and are used for the setting of box IDs to be described later. The connectors 196 are used to attach and wire-connect the mounting substrate 80 to sockets 82 provided to the back board 81. Note that, dot and dash lines shown in the drawing show main wirings wire-connecting the components mounted on the mounting substrate 80 to each other.

Each of the SAS expanders 191 includes a communication interface for communicating with SAS controllers 151 or the other SAS expanders 191, and processes data sent from the storage drives 18. For example, the SAS expander 191 functions as an initiator or a target in SMP (Serial Management Protocol), SSP (Serial SCSI protocol), and STP (Serial ATA tunneling protocol).

Each of the memories 193 is configured by using a RAM, a ROM, a NVRAM, or the like. Various kinds of data and programs (for example, an activation program for booting the SAS expander 191, and the like) are stored in the memory 193.

FIG. 9 shows a configuration of each of the SAS expanders 191. As shown in the drawing, the SAS expander 191 includes a processor 1911, a switch circuit 1912, a memory 1913, network ports 1914 (Phy) and the like.

The switch circuit 1912 includes an ECR (Expander Connection Router), an ECM (Expander Connection Manager), a BPP (Broadcast Primitive Processor), and the like. The ECR compares destination information stored in a header, or the like, of a frame arrived at each of the network ports 1914 with address information managed in the memory 1913, and outputs (transfers) the frame to the corresponding network port 1914. The ECM performs processing related to settings and the like of routing and zoning.

The BPP included in the switch circuit 1912 monitors changes in states of the switch circuit 1912, devices coupled to the switch circuit 1912, and communication, such as insertion and extraction states of the storage drives 18 coupled to the network ports 1914, existence or nonexistence of a physical link (Linkup/Linkdown), and existence or nonexistence of a communication failure. Moreover, when detecting the changes in states described above, the BPP appropriately sends a broadcast frame from the network port 1914.

Each of the network ports 1914 includes a serial-parallel conversion circuit such as a SerDes (Serializer/DeSerializer). Each of the network ports 1914 includes a transfer unit (Tx), a receiving unit (Rx), a buffer, an error detection circuit, and the like. Among these components, the buffer temporarily stores a received frame or a transferred frame. The error detection circuit monitors a communication error in the network port 1914. The error detection circuit, for example, checks a parity of the frame received or transferred by the network port 1914, and, when the parity matches a certain error pattern, increments a value of an error counter corresponding to the error pattern. An identifier (hereinafter, referred to as port ID) unique at least within the SAS expander 191 is assigned to each of the network ports 1914.

Each of the network ports 1914 can be set with parameters such as a transmission speed (3 Gbps, 6 Gbps, or the like) of communication performed using the network port 1914, an output amplitude, and a pre-emphasis. Setting information of routing, setting information of zoning, and the aforementioned parameters corresponding to each of the network ports 1914 are stored in the memory 1913. The aforementioned parameters can be set from the SVP 17.

Setting of the parameters for each of the network ports 1914 can be performed from the SVP 17. The processor 1911 sets the parameters for each of the network ports 1914 in accordance with an instruction from the SVP 17. The processor 1911 manages, in the memory 1913, the parameters currently set for each of the network ports 1914 and a SAS address (described later) assigned to the pertinent SAS expander 191.

The processor 1911 generates the SAS address (described later) of the pertinent SAS expander 191 on the basis of setting contents of the DIP switch 195, and stores the generated SAS address in the memory 193.

The components of the storage apparatus 10 are housed in a chassis made of a material such as metal or resin. FIG. 10 includes views showing a mounting pattern of the components of the drive units 1021 in a chassis 500, which is an example of a mounting pattern of the components of the storage apparatus 10 in the chassis 500.

In FIG. 10, (a) is a view of the chassis 500 seen from the front side, and (b) is a view thereof seen from the back side. The chassis 500 is approximately rectangular parallelepiped having such a structure whose inside is accessible from the front side and the back side. A ventilation structure, an electromagnetic shield structure, and the like are provided at certain positions of the side plate and the top plate of the chassis 500.

The aforementioned back board 81 (not shown) is provided in the chassis 500 in a manner fixed to a frame structure of the chassis 500 and extending in a direction parallel to the front face (or the back face) of the chassis 500. Guide rails (not shown) for installing units such as circuit boards on which the components of the storage apparatus 10 are mounted are provided at certain positions in the back board 81. The components of the drive units 1021 are mounted on the chassis 500 by inserting these units along the guide rails from the front face or the back face of the chassis 500.

As shown in (a) front view of FIG. 10, a plurality of storage drives 18, a plurality of power supply devices 501 ("HD-DPWR" in the drawing) supplying drive power to the storage drives 18, a plurality of SSWs 19 ("SSW-CL1" and "SSW-CL2"), a plurality of power supply devices 502 (DKUPS) supplying drive power to the entire drive units 1021, and the like are each mounted respectively at fixed positions on the front side the chassis 500.

As shown in (b) back view of FIG. 10, a plurality of storage drives 18, a plurality of power supply devices 501 ("HD-DPWR") supplying drive power to the storage drives 18, plurality of SSWs 19 ("SSW-CL1" and "SSW-CL2"), a plurality of power supply devices 502 (DKUPS) supplying drive power to the entire drive units 1021, and the like are each mounted at fixed positions on the back side the chassis 500.

As shown in broken lines in (a) front view and (b) back view of FIG. 10, the storage drives 18 mounted on the drive units 1021 are managed in sections formed by equally dividing each of the front and the back of the chassis 500 into four, being a total of eight (four in each of the front side and the back side) sections (hereinafter, referred to as boxes). A unique identifier (hereinafter, referred to as box ID (location information)) is assigned to each of the boxes. Note that, each of the SSWs 19 covers a plurality of boxes, but each of the SAS expanders 191 mounted on the SSW 19 is located in one of the boxes. Thus, the location of each of the SAS expanders 191 is identifiable with the corresponding box ID.

Note that, (a) front view and (b) back view of FIG. 10 show the mounting pattern of the components of the drive unit 1021 among the components of the storage apparatus 10 on the chassis 500. The other components of the storage apparatus 10 are each provided to belong to a certain one of the boxes which is sectioned in a certain chassis and which is identifiable from the box ID, similar to the components in the drive unit 1021.

In order to improve failure resistance and the like, each of the RAID groups is formed of the storage drives 18 which are different in hardware environment. For example, a single RAID group is formed of the storage drives 18 which are supplied with drive power from the power supply devices different from each other.

FIG. 11 shows a configuration example of the RAID groups. In this example, a single RAID group is formed using storage drives 18 respectively belonging to the drive units 1021 (HDU-0 to HDU-3) different from each other.

FIG. 12 is an example of a table (hereinafter, referred to as RAID group management table 1200) which is related to management of the RAID groups and which is stored in the SM 14 of the controller 101. As shown in the drawing, the RAID group management table 1200 is formed of a plurality of records each including items of a box ID 1211 in which the box ID is set, a drive ID 1212 in which an identifier (hereinafter, referred to as drive ID) of the storage drive 18 is set, and a RAID group ID 1213 in which an identifier (hereinafter, referred to as RAID group ID) of the RAID group is set.

As shown in the drawing, in this example, the RAID group with the RAID group ID of "0001" is formed of four storage drives 18 which are the storage drive 18 with the box ID of "00" and the drive ID of "00", the storage drive 18 with the box ID of "01" and the drive ID of "00", the storage drive 18 with the box ID of "02" and the drive ID of "00", and the storage drive 18 with the box ID of "03" and the drive ID of "00".

And the example of the RAID group with the RAID group ID of "0002" is formed of four storage drives 18 which are the storage drive 18 with the box ID of "00" and the drive ID of "01", the storage drive 18 with the box ID of "01" and the drive ID of "01", the storage drive 18 with the box ID of "02" and the drive ID of "01", and the storage drive 18 with the box ID of "03" and the drive ID of "01"

Among the components of the storage apparatus 10, devices complying with the SAS standards (hereinafter, referred to as SAS devices) are each set with a unique identifier (hereinafter, referred to as SAS address (network device ID)) assigned to each SAS device.

Each of the SAS devices stores a SAS address assigned thereto. For example, each of the storage drives 18 stores the SAS address assigned thereto in a memory included in the storage drive 18. Each of the SAS controllers 151 stores the SAS address assigned thereto in, for example, the memory 1513. Each of the SAS expanders 191 stores the SAS address assigned thereto in, for example, the memory 1913.

FIG. 13 shows a standard data format of the SAS address. As shown in the drawing, the SAS address is formed of 64 bits. Among these bits, an NAA identifier (Network Address Authority identifier) is set in the four bits from 64 to 61. A company ID of IEEE (Institute of Electrical and Electronics Engineers) is set in the 24 bits from 60 to 37. The 36 bits from 36 to 1 are a vender specific region, and a vendor dealing with the SAS device can freely set any value in this region.

FIG. 14 is a data format of the SAS address assigned to the storage drive 18. As shown in the drawing, in the vendor specific region, information on assignment of data blocks (Block Assignment) is set in the 12 bits from 36 to 25, the port ID of the network port 1914 coupled to the storage drive 18 is set in the two bits of 24 and 23, and a serial number (S/N (Serial Number)) assigned to the storage drive 18 is set in the 22 bits from 22 to 1.

FIG. 15 is a data format of the SAS address assigned to the SAS expander 191. As shown in the drawing, in the vendor specific region, the box ID of the box to which the SAS expander 191 belongs is set in the eight bits from 8 to 1.

FIG. 16 is a flowchart for explaining a process (hereinafter, referred to as SAS address setting process S1600) performed in the storage apparatus 10 when the SAS address of the aforementioned SAS expander 191 is set. The process will be described below with reference to the drawing.

When the SAS address of the SAS expander 191 is to be set (S1611), first, the processor 1911 of the SAS expander 191 acquires the box ID set for the DIP switch 195 of this SAS expander 191 (S1612). Then, the processor 1911 automatically generates a SAS address by setting (incorporating) the acquired box ID in the 8 bits from 8 to 1 of the SAS address. Note that, regarding the vendor specific information set in 28 bits from 36 to 9 of the SAS address, the processor 1911 performs setting thereof on the basis of, for example, information set in the memory 1913 in advance and information notified from the MP 12.

The processor 1911 stores the generated SAS address in the memory 1913 (S1613) and sends the generated SAS address to the MP 12 of the controller 101 (S1614).

When receiving the SAS address (S1615), the MP 12 reflects the received SAS address in a table (hereinafter, referred to as SAS address management table 1700 (first table)) stored in the SM 14 (S1616).

As described above, regarding the SAS expander 191, the SAS address including the box ID (location information) is automatically generated and notified to the controller 101. Thus, the controller 101 can identify the location of the SAS expander 191 by simply acquiring the SAS address from the SAS expander 191.

FIG. 17 shows an example of the SAS address management table 1700 stored in the SM 14. As shown in the drawing, the SAS address management table 1700 is formed of one or more records in each of which a box ID 1711 and a SAS address 1712 are associated with each other.

The box ID of the box to which the SAS controller 151 or the SAS expander 191 identified from the SAS address 1712 belongs is set in the box ID 1711. The SAS address of the SAS controller 151 or the SAS expander 191 is set in the SAS address 1712 (in a case of the SAS expander 191, the SAS address sent from the SAS expander 191 is set).

The MP 12 refers to the SAS address management table 1700, and thus identifies the box in which the SAS controller 151 or the SAS expander 191 corresponding to the SAS address exists.

Note that, contents of the SAS address management table 1700 can be accessed from the management apparatus 4 via the SVP 17 whenever necessary, and the user can operate the management apparatus 4 to refer to and edit the contents of the SAS address management table 1700.

As described above, the output amplitude and the pre-emphasis can be set as parameters for each of the network ports 1514 of the SAS controllers 151 and the network ports 1914 of the SAS expanders 191. In the SM 14 of the controller 101, the parameters set for the network ports 1514 of the SAS controllers 151 and the network ports 1914 of the SAS expanders 191 in the storage apparatus 10 are managed.

FIG. 18 is an example of a table stored in the SM 14 of the controller 101, and is a table (hereinafter, referred to as parameter management table 1800) in which the parameters set for the network ports 1514 and the network ports 1914 are managed. As shown in the drawing, the parameter management table 1800 is formed of one or more records each including items of box ID 1811, port ID 1812, output amplitude 1813, and pre-emphasis 1814.

Among these items, in the box ID 1811, the box ID of the box to which the network port 1514 of the SAS controller 151 or the network port 1914 of the SAS expander 191 belongs is set. In the port ID 1812, the port ID of the network port 1514 of the SAS controller 151 or the port ID of the network port 1914 of the SAS expander 191 is set. In the output amplitude 1813, the output amplitude set for the network port (network port 1514 or network port 1914) is set. In the pre-emphasis 1814, the pre-emphasis set for the network port (network port 1514 or network port 1914) is set.

Note that, contents of the parameter management table 1800 can be accessed from the management apparatus 4 via the SVP 17 whenever necessary, and the user can operate the management apparatus 4 to refer to and edit the contents of the parameter management table 1800.

A cable length of the network cable 105 coupled to each of the network ports (network port 1514 and network port 1914) of the SAS controllers 151 and the SAS expanders 191 is managed in the SM 14 of the controller 101.

FIG. 19 is a table stored in the SM 14 of the controller 101, and is a table (hereinafter, referred to as cable length management table 1900 (second table)) in which the cable length of the network cable 105 coupled to each of the network ports (network ports 1514 and network ports 1914) is managed. Contents of the cable length management table 1900 are set, for example, from the management apparatus 4 via the SVP 17.

As shown in the drawing, the cable length management table 1900 is formed of one or more records each including items of box ID 1911, port ID 1912, and cable length 1913. Among these items, in the box ID 1911, the box ID of the box to which the network port (network port 1514 or network port 1914) belongs is set. In the port ID 1912, the port ID of the network port (network port 1514 or network port 1914) is set. In the cable length 1913, the cable length of the network cable 105 coupled to that network port (network port 1514 or network port 1914) is set.

Note that, contents of the cable length management table 1900 can be accessed from the management apparatus 4 via the SVP 17 whenever necessary, and the user can operate the management apparatus 4 to refer to and edit the contents of the cable length management table 1900.

<First Method>

The MP 12 performs setting of the parameters for each of the network ports 1514 of the SAS controllers 151 and the network ports 1914 of the SAS expanders 191. This setting is performed when the setting of the network port 1514 or the network port 1914 becomes necessary, such as when the storage apparatus 10 is booted, when the storage device unit 102 is installed/replaced, when the SAS controller 151 or the SAS expander 191 is installed/replaced, or when an instruction is given to the storage apparatus 10 from the management apparatus 4, for example.

FIG. 20 is a flowchart for explaining processes (hereinafter, referred to as parameter setting process S2000) performed in the storage apparatus 10 when the parameters are set for the network port 1914. The process will be described with reference to the drawing.

First, the MP 12 performs operation setting (presetting) of the storage apparatus 10 which is necessary in order to perform parameter setting, the operation setting including suspension of use of the network port 1514 or the network port 1914 being a target of the parameter setting (hereinafter, referred to as target network port) and the like (S2011). Note that, restriction of use of the storage apparatus 10 during the parameter setting can be reduced to a minimum level, for example, by continuing the I/O process using one of the redundant communication paths.

Next, the MP 12 sets the transmission speed of the communication path from the MP 12 to the target network port, i.e. the transmission speed of the network port (network port 1514 or network port 1914) existing in the communication path, to "low speed" (S2012). For example, if the target network port is the network port 1914 of the SAS expander 191 of the drive unit 1021 which is denoted by reference numeral 511 in FIG. 5, the transmission speed of each of the network cables 105 of "NETWORK CABLE C", "NETWORK CABLE B" and "NETWORK CABLE A" is set to "low speed". Note that, in the present embodiment, "low speed: 3 Gbps" or "high speed: 6 Gbps" can be set for each network port (network port 1514 or network port 1914) as the transmission speed.

Then, the MP 12 sends an instruction (hereinafter, referred to as parameter setting instruction) to set the parameters of the target network port to the SAS controller 151 or the SAS expander 191 (hereinafter, referred to as target network device) in which the target network port exists (S2013).

When receiving the parameter setting instruction (S2014), the target network device performs a process (hereinafter, referred to as output amplitude determination process S2015) to determine the output amplitude to be set for the target network port, and thus determines the output amplitude to be set for the target network port (S2015). Note that, the output amplitude determination process S2015 will be described in detail later.

Thereafter, the target network device performs a process (hereinafter, referred to as pre-emphasis determination process S2016) to determine the pre-emphasis to be set for the target network port, and thus determines the pre-emphasis to be set for the target network port (S2016). Note that, the pre-emphasis determination process S2016 will be described in detail later.

Next, the target network device sets the output amplitude determined by performing the output amplitude determination process S2015 and the pre-emphasis determined by performing the pre-emphasis determination process S2016 for the target network port (S2017). Moreover, the target network device sends the MP 12 the parameters (output amplitude and pre-emphasis) set for the target network port (S2018).

When receiving the parameters (S2019), the MP 12 reflects the received parameters in the parameter management table 1800 (S2020). Then, the MP 12 sets the transmission speed of the target network port to "high speed", and performs the operation setting of the storage apparatus 10, such as resuming the use of the target network port. Thus, the use of the target network port is started (S2021).

Note that, the pre-emphasis determination process S2016 is performed after the output amplitude determination process S2015 in the parameter setting process S2000 described above. However, reversely, the output amplitude determination process S2015 may be performed after the pre-emphasis determination process S2016.

Moreover, in the parameter setting process S2000 described above, both the output amplitude and the pre-emphasis are set. However, only one of the output amplitude determination process S2015 and the pre-emphasis determination process S2016 may be executed to set only the corresponding one of the output amplitude and the pre-emphasis.

<Output Amplitude Determination Process>

FIG. 21 is a flowchart for explaining the aforementioned output amplitude determination process S2015. The process will be described below with reference to the drawing. Note that, when the output amplitude determination process S2015 is executed, it is assumed for example that a default value set in advance is set as the pre-emphasis for the target network port, or that, if the pre-emphasis determination process S2016 is performed in advance, the pre-emphasis determined in that process is set as the pre-emphasis for the target network port.

First, the target network device sets a variable A to be used in the following process to a minimum value Amin of the output amplitude (for example, minimum value of the output amplitude settable for the target network port (minimum value within a variable range of the output amplitude)), the minimum value Amin serving as an initial value (S2111).

Next, the target network device sets the transmission speed of the target network port to "low speed" (S2112), and sets the output amplitude of the targets network port to A (S2113). Note that, the transmission speed of the target network port is set to "low speed" to surely perform the setting of the output amplitude.

Thereafter, the target network device sets the transmission speed of the target network port to "high speed" (S2114), and tests whether the target network port can link up (S2115). When the link up is successful (S2116: YES), the target network device sets an output amplitude MIN to A, the output amplitude MIN being a variable for holding the minimum value of output amplitude at which the link up can be performed (S2118). Then, the process proceeds to S2121. When the link up fails (S2116: NO), the target network device adds deltaA to the variable A (S2117) and the process from S2112 is repeated.

In S2121, the target network device sets variable A to the maximum value Amax of the output amplitude (for example, maximum value of the output amplitude settable for the target network port).

Next, the target network device sets the transmission speed of the target network port to "low speed" (S2122), and sets the output amplitude of the target network port to A (S2123). Note that, the transmission speed of the target network port is set to "low speed" to surely perform the setting.

Thereafter, the target network device sets the transmission speed of the target network port to "high speed" (S2124), and tests whether the target network port can link up (S2125). When the link up is successful (S2126: YES), the target network device sets output amplitude MAX to A, the output amplitude MAX being a variable for holding the maximum value of output amplitude at which the link up can be performed (S2128). Then, the process proceeds to S2129. When the link up fails (S2126: NO), the target network device subtracts deltaA from the variable A (S2127) and the process from S2122 is repeated.

In S2129, the target network device obtains an arithmetical mean between the output amplitude MIN and the output amplitude MAX, and determines (outputs) the obtained arithmetical mean as the output amplitude to be set for the target network port.

<Pre-Emphasis Determination Process>

FIG. 22 is a flowchart for explaining the aforementioned pre-emphasis determination process S2016. The process will be described below with reference to the drawing. Note that, when the pre-emphasis determination process S2016 is executed, it is assumed for example that a default value set in advance is set as the output amplitude for the target network port, or that, if the output amplitude determination process S2015 is performed in advance, the output amplitude determined in that process is set as the output amplitude for the target network port.

First, the target network device sets a variable P to be used in the following process to a minimum value Pmin of the pre-emphasis (for example, minimum value of the pre-emphasis settable for the target network port (minimum value within a variable range of the pre-emphasis)), the minimum value Pmin serving as an initial value (S2211).

Next, the target network device sets the transmission speed of the target network port to "low speed" (S2212), and sets the pre-emphasis of the target network port to P (S2213). Note that, the transmission speed of the target network port is set to "low speed" to surely perform the setting of the pre-emphasis.

Thereafter, the target network device sets the transmission speed of the target network port to "high speed" (S2214), and tests whether the target network port can link up (S2215). When the link up is successful (S2216: YES), the target network device sets a pre-emphasis MIN to P, the pre-emphasis MIN being a variable for holding the minimum value of pre-emphasis at which the link up can be performed (S2218). Then, the process proceeds to S2221. When the link up fails (S2216: NO), the target network device adds deltaP to the variable P (S2217) and the process from S2212 is repeated.

In S2221, the target network device sets variable P to maximum value Pmax of the pre-emphasis (for example, maximum value of the pre-emphasis settable for the target network port (maximum value within a variable range of the pre-emphasis)).

Next, the target network device sets the transmission speed of the target network port to "low speed" (S2222), and sets the pre-emphasis of the targets network port to P (S2223). Note that, the transmission speed of the target network port is set to "low speed" to surely perform the setting of the pre-emphasis.

Thereafter, the target network device sets the transmission speed of the target network port to "high speed" (S2224), and tests whether the target network port can link up (S2225). When the link up is successful (S2226: YES), the target network device sets a pre-emphasis MAX to P, the pre-emphasis MAX being a variable for holding the maximum value of pre-emphasis at which the link up can be performed (S2228). Then, the process proceeds to S2229. When the link up fails (S2226: NO), the target network device subtracts deltaP from the variable P (S2227) and the process from S2222 is repeated.

In S2229, the target network device obtains an arithmetical mean between the pre-emphasis MIN and the pre-emphasis MAX, and determines (outputs) the obtained arithmetical mean as the pre-emphasis to be set for the target network port.

As described above, in the first method, the parameters are determined automatically for each of the network ports 1514 of the SAS controllers 151 and the network ports 1914 of the SAS expanders 191 by testing whether the link up can be actually established, and the determined parameters are automatically set for the network port (network port 1514 or network port 1914). Thus, appropriate parameters can be efficiently set for the network port (network port 1514 and network port 1914).

<Second Method>

As described above, according to the first method, appropriate parameters can be efficiently set for the network port (network port 1514 or network port 1914). However, when the number of target network ports is large, a long time is required for the setting, and the load on the storage apparatus 10 also becomes a problem. Particularly, in such a case where the storage apparatus 10 is installed or where a plurality of storage device units 102 are installed/replaced, setting of the parameters has to be performed simultaneously for the entire large number of target network ports, and thus a long time will be required for the storage apparatus 10 to boot. In the second method, the parameter setting for such a large number of target network ports is to be made more efficient.

FIGS. 23 to 25 each are a flowchart for explaining a process (hereinafter, referred to as parameter setting process S2300) performed by the storage apparatus 10 in the second method. The parameter setting process S2300 is executed when the setting of the parameters of the network port 1914 becomes necessary, such as when the storage apparatus 10 is booted, when the storage device unit 102 is installed/replaced, when the SAS controller 151 or the SAS expander 191 is installed/replaced, or when an instruction is given to the storage apparatus 10 from the management apparatus 4, for example. The process will be described below with reference to the drawings.

As shown in FIG. 23, the MP 12 first refers to the cable length management table 1900 (FIG. 19), and identifies a network port (hereinafter, referred to as shortest network port (first network port)) to which the network cable 105 with the shortest cable length is coupled, among the plurality of target network ports. Then, the MP 12 refers to the SAS address management table 1700 (FIG. 17) and acquires the SAS address of a device (SAS controller 151 or SAS expander 191) in which the shortest network port exists (S2311).

Next, the MP 12 first refers to the cable length management table 1900 (FIG. 19), and identifies a network port (hereinafter, referred to as longest network port (second network port)) to which the network cable 105 with the longest cable length is coupled, among the plurality of target network ports. Then, the MP 12 refers to the SAS address management table 1700 (FIG. 17) and acquires the SAS address of a device (SAS controller 151 or SAS expander 191) in which the longest network port exists (S2312).

Then, the MP 12 performs operation setting (presetting) of the storage apparatus 10 which is necessary in order to perform parameter setting, the operation setting including suspension of use of the target network ports and the like (S2313). Moreover, the MP 12 sets the transmission speed of a communication path leading to each of the identified target network ports (shortest network port and the longest network port) to "low speed" (S2314). Note that, restriction on use of the storage apparatus 10 during the parameter setting can be reduced to a minimum level, for example, by continuing the I/O process using one of the redundant communication paths.

Thereafter, the MP 12 sends an instruction (hereinafter, referred to as shortest parameter determination instruction (first parameter determination instruction)) to determine the output amplitude and the pre-emphasis to the SAS controller 151 or the SAS expander 191 in which the shortest network port exists (hereinafter, referred to as shortest target network device (first network device)) (S2315).

When receiving the shortest parameter determination instruction (S2316), the shortest target network device executes the aforementioned output amplitude determination process S2015 and pre-emphasis determination process S2016 for the shortest network port being the target. The shortest target network device sends the MP 12 the parameters (hereinafter, referred to as shortest parameter (first parameter)) determined by executing the output amplitude determination process S2015 and the pre-emphasis determination process S2016 (S2319).

When receiving the shortest parameter (S2320), the MP 12 sends an instruction (hereinafter, referred to as longest parameter determination instruction (second parameter determination instruction)) to determine the output amplitude and the pre-emphasis to the SAS controller 151 or the SAS expander 191 in which the longest network port exists (hereinafter, referred to as longest target network device (second network device)) (S2321 of FIG. 24).

When receiving the longest parameter determination instruction (S2323), the longest target network device executes the aforementioned output amplitude determination process S2015 and pre-emphasis determination process S2016 for the longest network port being the target. The longest target network device sends the MP 12 the parameters (hereinafter, referred to as longest parameters (second parameter)) determined by executing the output amplitude determination process S2015 and the pre-emphasis determination process S2016 (S2325).

When receiving the longest parameter (S2328), the MP 12 obtains a relationship between the cable length of the network cable 105 and the output amplitude on the basis of the shortest parameter received from the shortest target network device and the longest parameter received from the longest target network device (S2329).

Here, the cable length and the output amplitude have been found to have an approximately linear relationship. Accordingly, the slope of the output amplitude with respect to the change in the cable length is obtained from the following formula for example, and thus the relationship between the cable length and the output amplitude can be obtained as a linear function.

Slope=(output amplitude of longest network port–
output amplitude of shortest network port)/(cable
length of network cable coupled to longest net-
work port–cable length of network cable coupled
to shortest network port)     (Formula 1)

Moreover, the MP 12 obtains a relationship between the cable length and the pre-emphasis on the basis of the shortest parameter received from the shortest target network device and the longest parameter received from the longest target network device (S2330).

Here, the cable length and the pre-emphasis have been found to have an approximately linear relationship. Accordingly, the slope of the pre-emphasis with respect to the change in the cable length is obtained from the following formula for example, and thus, the relationship between cable length and pre-emphasis can be obtained as a linear expression.

Slope=(pre-emphasis of longest network port–pre-
emphasis of shortest network port)/(cable length
of network cable coupled to longest network
port–cable length of network cable coupled to
shortest network port)     (Formula 2)

An example of the relationship between cable length and output amplitude obtained and the relationship between cable length and pre-emphasis as described above are shown in FIG. 26.

Returning to FIG. 24, next, the MP 12 obtains the output amplitude to be set for each of the target network ports on the basis of the cable length management table 1900 (FIG. 19) and the relationship between the cable length and the output amplitude obtained in S2329 (S2331). Moreover, the MP 12 obtains the pre-emphasis to be set for each of the target network ports on the basis of the cable length management table 1900 (FIG. 19) and the relationship between the cable length and the pre-emphasis obtained in S2331 (S2332). Examples of the output amplitudes and pre-emphases determined as described above are shown in FIG. 27.

Next, the MP 12 sends an instruction to set the parameters (output amplitude obtained in S2331 and pre-emphasis obtained in S2332) to the target network devices in which the target network ports exist (S2333 of FIG. 25). When receiving the setting instruction (S2334), each of the target network devices sets the parameters instructed from the MP 12, for the corresponding target network port (S2335). When the setting is completed, the target network device sends the MP 12 a completion notification of the setting together with the set parameters (S2336).

When receiving the notification of completion and the parameters (S2337), the MP 12 reflects the received parameters in the parameter management table 1800 (S2338).

Then, the MP 12 sets the transmission speed of each of the target network ports to "high speed", and performs operation setting of the storage apparatus 10, such as resuming the use of the target network ports. Thus, the use of the target network ports is started (S2339).

As described above, the parameters for each of the plurality of target network ports are set in the following way in the second method. The storage apparatus 10 performs the output amplitude determination process S2015 and the pre-emphasis determination process S2016 only for the shortest network port and the longest network port. The storage apparatus 10 then obtains the relationship between the cable length and the parameters by using the parameters obtained in those processes, and automatically obtains the parameters to be set for the other target network ports by using the obtained relationship. Thus, compared to the case of performing a link up test for each of the target network ports to determine the parameters, the throughput is significantly reduced. Accordingly, the time required for the setting can be shortened, and appropriate parameters can be efficiently set for the target network ports, even when the number of the target network ports to be set simultaneously is large.

Note that, in the second method described above, it is assumed that the plurality of target network ports being the targets of the parameter setting all belong to the same type of device (either one of SAS controller 151 or SAS expander 191). However, if the SAS controller 151 and the SAS expander 191 have almost no difference therebetween in terms of the relationship between the cable length and the parameters, the plurality of target network ports being the targets of the parameter setting may mixedly belong to different types of devices (SAS controller 151 and SAS expander 191).

Moreover, in the above description, the relationship between the cable length and the parameters are obtained by performing link up tests for the shortest network port coupled to the shortest communication table and the longest network port coupled to the longest network cable among the target network ports. However, the shortest and longest network cables are not necessary selected. The relationship between the cable length and the parameters can be obtained as long as the link up tests are performed for two target network ports which are respectively connected to the network cables with different cable lengths. However, it is conceived that, when the link up tests are performed for the network ports respectively coupled to the shortest and longest network cables (link up tests are performed by selecting such network ports that the difference between the cable lengths of the respective network cables coupled thereto is as large as possible), the accuracy (appropriateness of the parameters) of the above-described relationship (linear expression) obtained as a result of the tests is generally improved in many cases.

<Third Method>

Next, a third method will be described. Similar to the second method, the third method also allows the parameter setting for a plurality of target network ports to be performed more efficiently. FIGS. 28 and 29 are each a flowchart for explaining a process (hereinafter, referred to as parameter setting process S2800) performed by the storage apparatus 10 in the third method.

The process shown in the drawings is performed when the setting of the parameters for the network ports (network ports 1514 and network ports 1914) becomes necessary, such as when the storage apparatus 10 is booted, when the storage device unit 102 is installed/replaced, when the SAS controller 151 or the SAS expander 191 is installed/replaced, or when an instruction is given to the storage apparatus 10 from the management apparatus 4, for example.

In the third method, the parameters of the target network ports are determined by also using a relationship between the cable length and the parameters which has been stored in advance. The parameter setting process S2800 according to the third method is executed on the assumption that the storage apparatus 10 has obtained samples of the relationship between the cable length and the parameters (output amplitude and pre-emphasis) in advance by executing the output amplitude determination process S2015 or the pre-emphasis determination process S2016 for several configurations (several configurations different in type of device (SAS controller 151 or SAS expander 191), chassis of storage device unit 102, position of network cable, type of network cable, and the like), and that the samples are stored in the SM 14 (S2811). FIG. 30 shows an example of the samples (relationship between the cable length and the output amplitude, and relation ship between the cable length and the pre-emphasis) which the storage apparatus 10 stores in the SM 14 in advance.

As shown in FIG. 28, the MP 12 first performs operation setting (presetting) of the storage apparatus 10 which is necessary in order to perform the parameter setting, the operation setting including suspension of the use of the target network ports, and the like (S2812). Moreover, the MP 12 sets the transmission speed of a communication path from the MP 12 to each of the target network ports to "low speed" (S2813). Note that, restriction on use of the storage apparatus 10 during the parameter setting can be reduced to a minimum level, for example, by continuing the I/O process using one of the redundant communication paths.

Thereafter, the MP 12 sends an instruction (hereinafter, referred to as parameter determination instruction) to determine the output amplitude and the pre-emphasis for one of the plurality of target network ports (for example, the aforementioned shortest network port or longest network port) to the SAS controller 151 or the SAS expander 191 (hereinafter, referred to as target network device) in which that one target network port (hereinafter, referred to as certain network port) exists (S2814).

When receiving the parameter determination instruction (S2815), the target network device executes the aforementioned output amplitude determination process S2015 and pre-emphasis determination process S2016 for the certain network port being the target, and sends determined parameters (hereinafter, referred to as certain parameters) to the MP 12 (S2818).

When receiving the certain parameters (S2819), the MP 12 acquires the cable length of the network cable coupled to the certain network port from the cable length management table 1900 (FIG. 19) (S2820), and obtains values of the respective parameters corresponding to the acquired cable length of the network cable on the basis of the samples held in advance (S2821). Then, each of the certain parameters is compared with the corresponding parameters obtained from the samples, and the sample with the smallest difference (the sample with the best approximate parameter to the certain parameter) is identified (S2822 of FIG. 29).

Next, the MP 12 obtains the output amplitude to be set for each of the target network ports on the basis of the cable length management table 1900 (FIG. 19) and the sample identified in S2822 (relationship between the cable length and the output amplitude) (S2823). Moreover, the MP 12 obtains the pre-emphasis to be set for each of the target network ports on the basis of the cable length management table 1900 (FIG. 19) and the sample identified in S2822 (relationship between the cable length and the pre-emphasis) (S2824).

Thereafter, the MP 12 sends an instruction to set the parameters (output amplitude obtained in S2821 and pre-emphasis obtained in S2822) to each of the target network devices in which the target network ports exist (S2825 of FIG. 29). When receiving the above mentioned setting instruction (S2826), each target network device sets the parameters instructed from the MP 12, for the corresponding target network port (S2827). When the setting is completed, each target network device sends the MP 12 a completion notification of the setting together with the set parameters (S2828).

When receiving the notification of completion and the parameters (S2829), the MP 12 reflects the received parameters in the parameter management table 1800 (S2830).

Then, the MP 12 sets the transmission speed of each of the target network ports to "high speed", and performs operation setting of the storage apparatus 10, such as resuming the use of the target network ports. Thus, the use of the target network ports is started (S2831).

As described above, in the third method, the relationship between the cable length and the parameters is obtained in advance and held as samples. Then, the parameters are obtained by performing a link up test for only the certain network port which is one of the target network ports, the sample with the best approximate parameter to the obtained parameter is used to determine the parameters for each of the target network ports. Thus, compared to the second method, the throughput is reduced. Accordingly, appropriate parameters can be efficiently set for the target network ports.

<Increasing Speed of Parameter Determination Process>

In the output amplitude determination process S2015 and the pre-emphasis determination process S2016 described above, the transmission speed of the target network port is set to "low speed" when the parameters (output amplitude and pre-emphasis) are set for the target network port, and is switched to "high-speed" when the link up test is performed. Such switching applies a load to the storage apparatus 10, and becomes a cause for lengthening the time required to set the parameters. This is a problem particularly when the number of target network ports is large.

However, when there are a plurality of communication paths from the MP 12 to SAS expander 191, the output amplitude determination process S2015 and the pre-emphasis determination process S2016 can be executed in the following manner, for example. Among the plurality of communication paths, a communication path other than the communication path configured using the target network port have their transmission speed set to "low speed", and the parameter set for the target network port through the other communication path set to "low speed". Thus, the output amplitude determination process S2015 and the pre-emphasis determination process 2016 can be executed without having the transmission speed switched for the target network port (while having the transmission speed fixed to "high speed" for the target network port).

For example, as shown in FIG. 31, when the target network port is the network port 1914 denoted by reference numeral P1 of the SAS expander 191 called "SAS EXPANDER 1", the transmission speed of the network port 1914 denoted by reference numeral P2 of this SAS expander 191 is set to "low speed" and the parameters are set for the target network port. Here, switching of the transmission speed is not performed for the network port 1914 denoted by reference numeral P1 (transmission speed is fixed to "high speed").

As described above, when a plurality of communication paths exist from the MP 12 to the SAS expander 191, there is no need to switch the transmission speed for the target network port. Thus, the output amplitude determination process S2015 and the pre-emphasis determination process S2016 can be performed efficiently, and the parameters can be swiftly set for the target network port.

Although embodiments of the present invention have been described so far, it should be understood that the embodiments described above are for facilitating the understanding of the present invention, and it should not be interpreted to limit the present invention. The present invention can be modified or improved without departing from the gist thereof, and equivalents thereof are also encompassed by the present invention.

For example, the MP 12 may be configured to execute all or part of the aforementioned output amplitude determination process S2015 and pre-emphasis determination process S2016.

In the aforementioned output amplitude determination process S2015 and pre-emphasis determination process S2016, the minimum value and the maximum value of the output amplitude and the minimum value and the maximum value of the pre-emphasis are measured for the target network ports. However, if these measured values are associated with the port ID of each of the network ports (network port 1514 and network port 1914) and held in the SM 14, the following operation is made possible. For example, when some sort of failure occurs in the storage apparatus 10, a diagnosis (whether link up can be established or not or the like) is performed by setting these values for the network port. Thus, the operation of the network port can be accurately judged.

The invention claimed is:

1. A storage apparatus comprising:
   a processor;
   a memory accessible by the processor; and
   at least one network device including at least one or more network ports to each of which a network cable configuring a communication path from the processor to a storage drive is coupled,
   the storage apparatus configured to receive an I/O request sent from an external apparatus, and perform I/O processing on the storage drive in accordance with the received I/O request, wherein the memory stores a first table being a table in which a network device ID being an identifier of the network device is associated with location information being information indicating a location of each of the network ports and stores a second table being a table in which a cable length of the network cable coupled to each of the network ports is associated with the location information and a port ID being an identifier of the network port,
   the processor stores a relationship between a cable length of the network cable and a parameter to be set for each of the network ports and determines the parameter to be set for each of the network ports by acquiring the cable length of the network cable coupled to the network port from the second table and acquiring the parameter corresponding to the acquired cable length from the relationship, and sets the thus determined parameter for the network port, wherein the network device performs communication in compliance with SAS (Serial Attached SCSI) standards, acquires the location information set for itself, and incorporates the acquired location information into a part of a SAS address of itself, and the processor acquires the SAS address from the network device, generates the first table on the basis of the acquired SAS address, and stores the first table in the memory, wherein the parameter is set at least one of output amplitude of a signal outputted from the network port and a pre-emphasis of a signal outputted from the network port.

2. The storage apparatus according to claim 1, wherein the processor identifies a first network port and a second network port among the network ports managed in the second table, the first network port being the network port to which is coupled a first network cable being the network cable with a first cable length, the second network port being the network port to which is coupled a second network cable being the network cable with a second cable length different from the first cable length, sends an instruction to determine a first parameter being the parameter for the first network port, to a first network device being a network device including the identified first network port, and sends an instruction to determine a second parameter being the parameter for the second network port, to a second network device being a network device including the identified second network port, the first network device determines the first parameter upon receiving the instruction, and sends the determined first parameter to the processor, the second network device determines the second parameter upon receiving the instruction, and sends the determined second parameter to the processor, and the processor receives the first parameter and the second parameter, generates and stores the relationship between the cable length of the network cable and the parameter on the basis of the first parameter, the second parameter, the first cable length, and the second cable length received.

3. The storage apparatus according to claim 1, wherein the processor stores a plurality of samples of the relationship, the processor sends an instruction to determine the parameter for a certain network port managed in the second table to the network device including the certain network port, the network device determines the parameter for the certain network port upon receipt of the instruction, and sends the determined parameter to the processor, the processor receives the parameter and identifies a sample that is, among the stored samples, a best approximation to the relationship between the cable length of the network cable coupled to the certain network port and the received parameter, and the processor acquires the cable length of the network cable coupled to the network ports from the second table, determines the parameter to be set for the network port by acquiring the parameter corresponding to the acquired cable length from the identified relationship, and sets the determined parameter for the network port.

4. The storage apparatus according to any one of claims 2 and 3, wherein the network device sequentially sets for the network port a plurality of the parameters respectively having values different from each other, and determines the parameter to be set for the network port by testing whether each of the settings enables link up of the network port or not.

5. The storage apparatus according to claim 4, wherein, when the network device sets the parameter for the network ports, the processor sets a transmission speed of the network port to a lower transmission speed than that set for the network port during the testing of the link up.

6. The storage apparatus according to claim 4, wherein
the network device includes a plurality of the network ports,
when the network device sets the parameter for the network ports, the processor sets the parameter by using one of the network ports of the network device that is a network port different from the network port being a target of setting the parameter, and
the processor sets a transmission speed of the different network port to a lower transmission speed than that set for the network port being the target of setting the parameter during the testing of the link up.

7. The storage apparatus according to claim 1, wherein
the network device performs communication in compliance with SAS (Serial Attached SCSI) standard, acquires the location information set for itself, and incorporates the acquired location information into a part of a SAS address of itself, and
the processor acquires the SAS address from the network device, generates the first table on the basis of the acquired SAS address, and stores the first table in the memory, wherein
at least one of an output amplitude of a signal outputted from the network port and a pre-emphasis of the signal outputted from the network port is set as the parameter, wherein
the processor identifies a first network port and a second network port among the network ports managed in the second table, the first network port being the network port to which is coupled a first network cable being the network cable with a first cable length, the second network port being the network port to which is coupled a second network cable being the network cables with a second cable length different from the first cable length,
the processor sends an instruction to determine a first parameter being the parameter for the first network port, to a first network device being a network device including the identified first network port,
the processor sends an instruction to determine a second parameter being the parameter for the second network port, to a second network device being a network device including the identified second network port,
the first network device determines the first parameter upon receiving the instruction, and sends the determined first parameter to the processor,
the second network device determines the second parameter upon receiving the instruction, and sends the determined second parameter to the processor, and
the processor receives the first parameter and the second parameter, generates and stores the relationship between the cable length of the network cable and the parameter on the basis of the first parameter, the second parameter, the first cable length, and the second cable length received, wherein
the processor stores a plurality of samples of the relationship, the processor sends an instruction to determine the parameter for a certain network port managed in the second table to the network device including the certain network port, the network device determines the parameter for the certain network port upon receipt of the instruction, and sends the determined parameter to the processor, the processor receives the parameter and identifies a sample that is, among the stored samples, a best approximation to the relationship between the cable length of the network cable coupled to the certain network port and the received parameter, and the processor acquires the cable length of the network cable coupled to the network ports from the second table, determines the parameter to be set for the network port by acquiring the parameter corresponding to the acquired cable length from the identified relationship, and sets the determined parameter for the network port, wherein the network device sequentially sets for the network port a plurality of the parameters respectively having values different from each other, and determines the parameter to be set for the network port by testing whether each of the settings enables link up of the network port or not, wherein when the network device sets the parameter for the network ports, the processor sets a transmission speed of the network port to a lower transmission speed than that set for the network port during the testing of the link up, and wherein the network device includes a plurality of the network ports, when the network device sets the parameter for the network ports, the processor sets the parameter by using one of the network ports of the network device that is a network port different from the network port being a target of setting the parameter, and the processor sets a transmission speed of the different network port to a lower transmission speed than that set for the network port being the target of setting the parameter during the testing of the link up.

8. A method of controlling a storage apparatus including a processor, a memory accessible by the processor, and at least one network device including at least one or more network ports to each of which a network cable configuring a communication path from the processor to a storage drive is coupled, the storage apparatus configured to receive an I/O request sent from an external apparatus, and perform I/O processing on the storage drive in accordance with the received I/O request, the method comprising:

the memory storing a first table being a table in which a network device ID being an identifier of the network device is associated with location information being information indicating a location of the network port, and storing a second table being a table in which a cable length of the network cable coupled to each network port is associated with the location information and a port ID being an identifier of the network port;

the processor storing a relationship between a cable length of the network cable and a parameter to be set for the network port and acquiring the cable length of the network cable coupled to the network port from the second table and acquires the parameter corresponding to the acquired cable length from the relationship to determine the parameter to be set for the network port, and sets the thus determined parameter for the network port, wherein the network device performs communication in compliance with SAS (Serial Attached SCSI) standards, acquires the location information set for itself, and incorporates the acquired location information into a part of a SAS address of itself, and the processor acquires the SAS address from the network device, generates the first table on the basis of the acquired SAS address, and stores the first table in the memory, wherein the parameter is set at least one of output amplitude of a signal outputted from the network port and a pre-emphasis of a signal outputted from the network port.

9. The method of controlling a storage apparatus according to claim 8, wherein the processor identifies a first network port and a second network port among the network ports managed in the second table, the first network port being the network port to which is coupled a first network cable being the network cable with a first cable length, the second network port being the network port to which is coupled a second network cable being the network cable with a second cable length different from the first cable length, the processor sends an instruction to determine a first parameter being the parameter for the first network port, to a first network device being a network device including the identified first network port, the processor sends an instruction to determine a second parameter being the parameter for the second network port, to a second network device being a network device including the identified second network port, the first network device determines the first parameter upon receiving the instruction, and sends the determined first parameter to the processor, the second network device determines the second parameter upon receiving the instruction, and sends the determined second parameter to the processor, and the processor receives the first parameter and the second parameter, generates and stores the relationship between the cable length of the network cable and the parameter on the basis of the first parameter, the second parameter, the first cable length, and the second cable length received.

10. The method of controlling a storage apparatus according to claim 8, wherein the processor stores a plurality of samples of the relationship, the processor sends an instruction to determine the parameter for a certain network port managed in the second table to the network device including the certain network port, the network device determines the parameter for the certain network port upon receipt of the instruction, and sends the determined parameter to the processor, the processor receives the parameter and identifies a sample that is, among the stored samples, a best approximation to the relationship between the cable length of the network cable coupled to the certain network port and the received parameter, and the processor acquires the cable length of the network cable coupled to the network ports from the second table, determines the parameter to be set for the network port by acquiring the parameter corresponding to the acquired cable length from the identified relationship, and sets the determined parameter for the network port.

11. The method of controlling a storage apparatus according to any one of claims 9 and 10, wherein the network device sequentially sets for the network port a plurality of the parameters respectively having values different from each other, and determines the parameter to be set for the network port by testing whether each of the settings enables link up of the network port or not.

12. The method of controlling a storage apparatus according to claim 11, wherein, when the network device sets the parameter for the network ports, the processor sets a transmission speed of the network port to a lower transmission speed than that set for the network port during the testing of the link up.

* * * * *

UNITED STATES PATENT AND TRADEMARK OFFICE
CERTIFICATE OF CORRECTION

| | | |
|---|---|---|
| PATENT NO. | : 8,190,790 B1 | Page 1 of 1 |
| APPLICATION NO. | : 13/133813 | |
| DATED | : May 29, 2012 | |
| INVENTOR(S) | : Ogawa et al. | |

It is certified that error appears in the above-identified patent and that said Letters Patent is hereby corrected as shown below:

ON THE TITLE PAGE

Left column, delete "(22) Filed: June 9, 2011", and insert:
--(22) PCT Filed: May 31, 2011
  (86) PCT No.: PCT/JP2011/003030
    §371 (c)(1),
    (2), (4) Date: June 9, 2011--.

Signed and Sealed this
Twenty-second Day of January, 2013

David J. Kappos
*Director of the United States Patent and Trademark Office*